United States Patent
Balogh et al.

(10) Patent No.: US 10,880,299 B2
(45) Date of Patent: Dec. 29, 2020

(54) MACHINE LEARNING FOR DOCUMENT AUTHENTICATION

(71) Applicant: Jumio Corporation, Palo Alto, CA (US)

(72) Inventors: Attila Balogh, Vienna (AT); Reinhard Hochrieser, Linz (AT); Radu Rogojanu, Vienna (AT)

(73) Assignee: Jumio Corporation, Palo Alto, CA (US)

( * ) Notice: Subject to any disclaimer, the term of this patent is extended or adjusted under 35 U.S.C. 154(b) by 287 days.

(21) Appl. No.: 15/993,366

(22) Filed: May 30, 2018

(65) Prior Publication Data

US 2019/0372968 A1 Dec. 5, 2019

(51) Int. Cl.
  *H04L 29/06* (2006.01)
  *G06N 20/00* (2019.01)
  *G06K 9/00* (2006.01)

(52) U.S. Cl.
  CPC ...... *H04L 63/0861* (2013.01); *G06K 9/00483* (2013.01); *G06N 20/00* (2019.01)

(58) Field of Classification Search
  CPC . H04L 63/0861; G06N 20/00; G06K 9/00483
  See application file for complete search history.

(56) References Cited

U.S. PATENT DOCUMENTS

| 8,533,194 B1 * | 9/2013 | Ravid | G06N 20/00 |
| | | | 707/737 |
| 2002/0194178 A1 * | 12/2002 | Gilmour | G06F 16/30 |

(Continued)

FOREIGN PATENT DOCUMENTS

EP 2784734 A1 10/2014

OTHER PUBLICATIONS

Jumio Corporation, International Search Report and Written Opinion, PCT/US2019/032597, dated Nov. 12, 2019, 11 pgs.

(Continued)

*Primary Examiner* — Ali S Abyaneh
*Assistant Examiner* — Zoha Piyadehghibi Tafaghodi
(74) *Attorney, Agent, or Firm* — Morgan, Lewis & Bockius LLP

(57) ABSTRACT

Computer systems and methods are provided for using a machine learning system to analyze authentication information. First authentication information for a first transaction includes at least a first image that corresponds to a first identification document is received. First validation information that corresponds to a first validation fault is received from a validation system. Data storage of a machine learning system stores the first validation information. Second authentication information for a second transaction includes a second image that corresponds to a second image is received. The machine learning system determines a first validation value that corresponds to a probability that the second image includes the first validation fault. The first validation value is used to determine whether fault review criteria are met. In accordance with a determination that the fault review criteria are met, the second image is transmitted to the validation system.

24 Claims, 18 Drawing Sheets

(56) References Cited

U.S. PATENT DOCUMENTS

| | | | |
|---|---|---|---|
| 2009/0152357 A1* | 6/2009 | Lei | G07D 7/202 |
| | | | 235/454 |
| 2014/0279716 A1* | 9/2014 | Cormack | G06F 16/285 |
| | | | 706/10 |
| 2014/0297528 A1* | 10/2014 | Agrawal | G06Q 20/40145 |
| | | | 705/44 |
| 2014/0380495 A1 | 12/2014 | Dedeoglu et al. | |
| 2016/0063397 A1* | 3/2016 | Ylipaavalniemi | G06K 9/6277 |
| | | | 706/12 |
| 2016/0162729 A1 | 6/2016 | Hagen et al. | |
| 2016/0328660 A1* | 11/2016 | Huang | G06Q 20/208 |
| 2017/0200247 A1 | 7/2017 | Kuklinski et al. | |
| 2017/0220949 A1* | 8/2017 | Feng | H04L 41/16 |
| 2017/0286765 A1 | 10/2017 | Rodriguez | |
| 2017/0294027 A1* | 10/2017 | Babenko | G06T 7/507 |
| 2018/0108101 A1 | 4/2018 | Rodriguez et al. | |

OTHER PUBLICATIONS

Jumio Corporation, International Search Report and Written Opinion, PCT/US2019/035233, dated Jul. 19, 2019, 12 pgs.

\* cited by examiner

MACHINE LEARNING FOR DOCUMENT AUTHENTICATION

TECHNICAL FIELD

This application relates generally to user authentication, and more particularly, to authentication using machine learning to generate algorithms for analyzing image data.

BACKGROUND

Identification and verification of remote users is important for many network communications and transactions. This is especially true with sensitive communications and important transactions when users are unacquainted and remote from each other. Traditionally, a person presents a physical identification document for inspection by an agent who compares a facial image of the identification document to the physical appearance of the person. However, the conventional mechanisms of identifying and verifying users are inconvenient and inefficient, and result in burdens for users.

SUMMARY

Accordingly, there is a need for systems and/or devices with more efficient, accurate, and intuitive methods for analyzing an image for authentication of a user. Such systems, devices, and methods optionally complement or replace conventional systems, devices, and methods for analyzing an image for authentication of the user.

In some embodiments, a machine learning system is used to generate a model that is used for analyzing image data. The image data includes, for example, an image of an identification document (e.g., an identification document, such as a passport or other government-issued document, that includes an image of a user) and/or an image captured of the user (e.g., a recent "selfie" image of the user). A computing system that implements machine learning analyzes a set of training data that include image data (e.g., image data included in a large number of authentication requests). The machine learning system is used to generate a model that can be used for analysis of incoming authentication requests. In some embodiments, a supervised training module of the machine learning system trains an authentication model using human tagged data (e.g., by iteratively classifying the data, comparing test data against human tags, and performing optimization to minimize classification error). In some embodiments, an unsupervised training module of the machine learning system trains an authentication model without using human input for classification (e.g., by encoding and clustering data to find potential groups and outliers). In some embodiments, the results of applying an authentication model (e.g., trained by supervised learning and/or unsupervised learning) to a set of authentication request data is compared against the results of human review of the same set of authentication request data, and discrepancies between the machine learning results and the human review results are used to alter the authentication model.

The disclosed subject matter includes, in one aspect, a computerized method for receiving first authentication information for a first transaction. The first authentication information includes at least a first image that corresponds to a first identification document. The method additionally includes receiving, from a validation system, first validation information that corresponds to a first validation fault. The method additionally includes storing, by data storage of a machine learning system, the first validation information. The method additionally includes receiving second authentication information for a second transaction. The second authentication information includes a second image that corresponds to a second identification document. The method additionally includes determining, using the machine learning system, a first validation value that corresponds to a probability that the second image includes the first validation fault. The method additionally includes determining, using the first validation value, whether fault review criteria are met. The method additionally includes, in accordance with a determination that the fault review criteria are met, transmitting, to the validation system, the second image.

In some embodiments, a computer readable storage medium stores one or more programs. The one or more programs comprise instructions, which, when executed, cause a device to receive first authentication information for a first transaction. The first authentication information includes at least a first image that corresponds to a first identification document. The one or more programs additionally comprise instructions that cause the device to receive, from a validation system, first validation information that corresponds to a first validation fault. The one or more programs additionally comprise instructions that cause the device to store, by data storage of a machine learning system, the first validation information. The one or more programs additionally comprise instructions that cause the device to receive second authentication information for a second transaction. The second authentication information includes a second image that corresponds to a second identification document. The one or more programs additionally comprise instructions that cause the device to determine, using the machine learning system, a first validation value that corresponds to a probability that the second image includes the first validation fault. The one or more programs additionally comprise instructions that cause the device to determine, using the first validation value, whether fault review criteria are met. The one or more programs additionally comprise instructions that cause the device to, in accordance with a determination that the fault review criteria are met, transmit, to the validation system, the second image.

In some embodiments, a system includes one or more processors, memory, and one or more programs. The one or more programs are stored in the memory and configured to be executed by the one or more processors. The one or more programs include instructions for receiving first authentication information for a first transaction. The first authentication information includes at least a first image that corresponds to a first identification document. The one or more programs additionally include instructions for receiving, from a validation system, first validation information that corresponds to a first validation fault. The one or more programs additionally include instructions for storing, by data storage of a machine learning system, the first validation information. The one or more programs additionally include instructions for receiving second authentication information for a second transaction. The second authentication information includes a second image that corresponds to a second identification document. The one or more programs additionally include instructions for determining, using the machine learning system, a first validation value that corresponds to a probability that the second image includes the first validation fault. The one or more programs additionally include instructions for determining, using the first validation value, whether fault review criteria are met. The one or more programs additionally include instructions for, in accordance with a determination that the fault review criteria are met, transmitting, to the validation system, the second image.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

In accordance with common practice, some of the drawings may not depict all of the components of a given system, method, or device. Finally, like reference numerals denote like features throughout the specification and figures.

DETAILED DESCRIPTION

Figure 1:
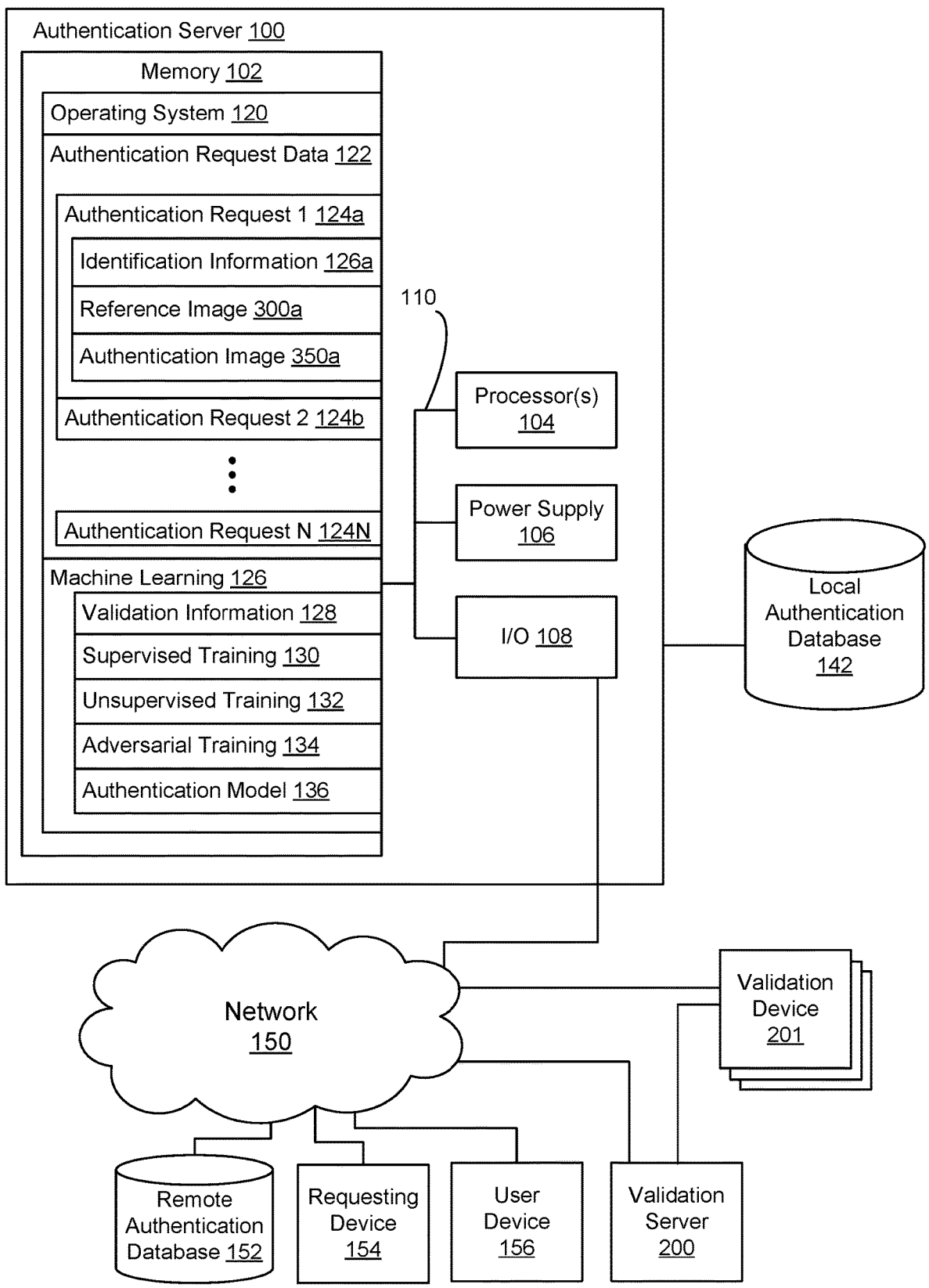
FIG. 1 is a system diagram of an authentication system and its context, in accordance with some embodiments.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

The systems and methods described herein pertain to machine learning algorithms for determining validity of one or more images that correspond to an authentication request. These systems and methods improve on prior techniques for determining image validity of images from an authorization request. In some embodiments, an authentication request is received from a requesting device (e.g., in connection with a payment or other secure transaction). In some embodiments, the authentication request includes an image of an identification document, such as a passport (e.g., that is associated with a user for whom a secure transaction is being performed). In some embodiments, the authentication request includes an image of the user (e.g., a recent "selfie" image). In response to the authentication request, an authentication system determines validity of the image of the identification document and/or compares the image of the user with the image of the identification document to determine whether matching criteria are met. Information about previously analyzed authentication requests is used by the authentication system to generate a model that is used to evaluate incoming authentication requests. In some embodiments, the model is generated via supervised machine learning (e.g., the model is generated and/or refined using validation faults labeled by a human reviewer). In some embodiments, the model is generated via unsupervised machine learning (e.g., the model is generated based on an unlabeled set of data). The model is used to determine whether criteria are met for transmitting an image from an authentication request to a validation system.

In some embodiments, the authentication systems described herein decrease the time required for human review of identification documents (e.g., by using a model generated by a machine learning system to analyze an image and provide information to human reviewers about information generated by the analysis) and/or reduce the extent of human review used for authenticating identification documents (e.g., by using the model to determine whether to bypass human review). Using machine learning as described herein to reduce the extent of human review and/or to reduce the time required for human review improves the authentication device by making the processing of authentication requests faster and more efficient, with less required human interaction, which in turn reduces the processing and power used by an authentication server and/or a validation device.

Additionally, there is a need to analyze identification documents to determine whether the identification documents are authentic, while maintaining compliance of the data set with applicable security standards. For example, the security of authentication data is maintained in compliance with the payment card industry data security standard (PCI DSS). Whereas existing machine learning systems may rely on labels assigned to a public set of data, PCI DSS compliance requires limited access to validation data sets. However, the usability of a model generated by a machine learning system improves as the size of the available data set increases. Various embodiments described herein advantageously perform machine learning using data generated by a limited set of human validation reviewers. Using a model generated by a machine learning system to perform image analysis reduces the amount of time required for human review of authorization requests, which increases the rate of authorization request processing while maintaining security of processed data.

FIG. 1 is a system diagram of an authentication server 100 (also referred to herein as a "machine learning system"), in accordance with some embodiments. The authentication server 100 typically includes a memory 102, one or more processor(s) 104, a power supply 106, an input/output (I/O) subsystem 108, and a communication bus 110 for interconnecting these components.

The processor(s) 104 execute modules, programs, and/or instructions stored in the memory 102 and thereby perform processing operations.

In some embodiments, the memory 102 stores one or more programs (e.g., sets of instructions) and/or data structures, collectively referred to as "modules" herein. In some embodiments, the memory 102, or the non-transitory computer readable storage medium of the memory 102 stores the following programs, modules, and data structures, or a subset or superset thereof:

an operating system 120;

an authentication request data module 122, which stores information for a plurality of authentication requests 124 (e.g., a first authentication request 124*a*, a second authentication request 124*b* . . . Nth authentication request 124N), each of which includes information such as identification information 126 (e.g., unique identification, user name, user password, user residential information, user phone number, user date of birth, and/or user e-mail), a reference image 300*a*, and/or an authentication image 350*a*; and a machine learning module 126 that uses supervised training module 130, unsupervised training module 132, and/or adversarial training module 134 to generate authentication model 136 (e.g., by analyzing validation information 128 corresponding to multiple authentication requests 124).

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 102 stores a subset of the modules identified above. In some embodiments, a remote authentication database 152 and/or a local authentication database 142 store a portion or all of one or more modules identified above (such as authentication request data 122, validation information 128, and/or authentication model 136). Furthermore, the memory 102 may store additional modules not described above. In some embodiments, the modules stored in the memory 102, or a non-transitory computer readable storage medium of the memory 102, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 104. In some embodiments, one or more of the modules described with regard to the memory 102 is implemented in the memory 202 of a validation device 201 (FIG. 2) and executed by the processor(s) 204 of the validation device 201. In some embodiments, one or more of the modules described with regard to the memory 102 is implemented in the memory 1202 of a user device 156 (FIG. 12) and executed by the processor(s) 1204 of the user device 156. For example, machine learning module 126 is distributed across authentication server 100, validation device(s) 201, validation server 200, and/or user device 156

In some embodiments, for each received authentication request 124, machine learning module 126 stores data for training authentication model, such as:

Channel via which the authentication request 124 was received (e.g., mobile, web, and/or application programming interface (API))

internet protocol (IP) address from which the authentication request 124 was received camera information (e.g., camera model, device of which the camera is a component, and/or orientation of camera relative to device);

transaction origination location (e.g., country, state, province, and/or city);

type of identification document captured in reference image 300 (e.g., passport, driver license, and/or corporate identification badge);

identification document origination location (e.g., country, state, province, and/or city); and/or validation information 128 (e.g., including a verification outcome such as verified, fraud detected, and/or rejected).

In some embodiments, generating the authentication model 136 includes generating a regression algorithm for prediction of continuous variables (e.g., perspective transformation of a reference image 300 and/or a more complex transformation describing bending of passport pages).

In some embodiments, the I/O subsystem 108 communicatively couples the computing system 100 to one or more devices, such as a local authentication database 142, a remote authentication database 152, a requesting device 154, a user device 156, validation server 200 (e.g., including one or more server components (e.g., one or more processor(s) and memory) and/or modules described with regard to authentication server 100) and/or validation device(s) 201 via a communications network 150 and/or via a wired and/or wireless connection. In some embodiments, the communications network 150 is the Internet.

The communication bus 110 optionally includes circuitry (sometimes called a chipset) that interconnects and controls communications between system components.

Typically, an authentication system for processing authentication requests includes a server computer system 100 that is communicatively connected to one or more validation devices 201 (e.g., via a network 150 and/or an I/O subsystem 108). In some embodiments, the authentication system receives an authentication request (e.g., from a user device 156 that captures an image of a user or from a requesting device 154 that receives an image from user device 156). For example, the authentication request is a request to authenticate the identity of a user 124 (e.g., a user that is a party to a transaction or a user that is requesting access to a system or physical location). Requesting device 154 is, for example, a device of a merchant, bank, transaction processor, computing system or platform, physical access system, or another user. User device 156 is described in further detail with regard to FIG. 12 below.

Figure 3A:
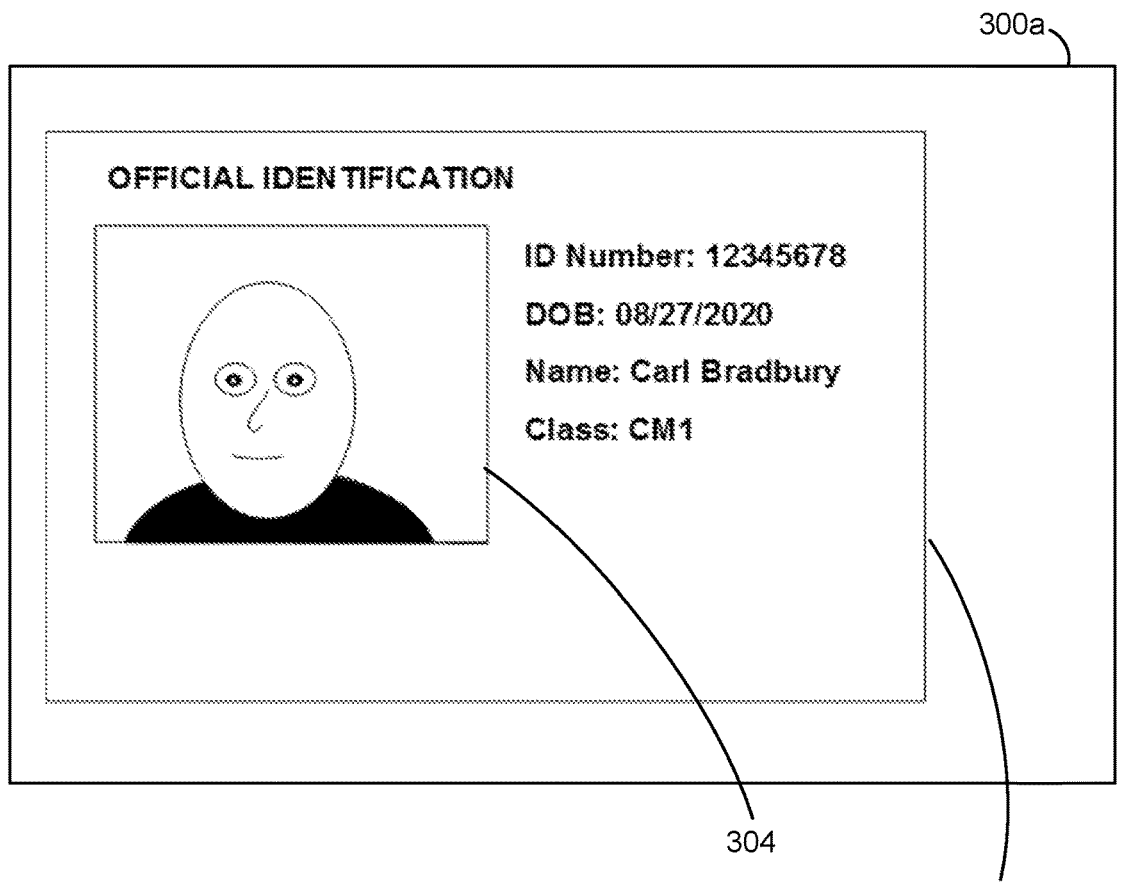
FIG. 3A illustrates a reference image, in accordance with some embodiments.
Figure 3B:
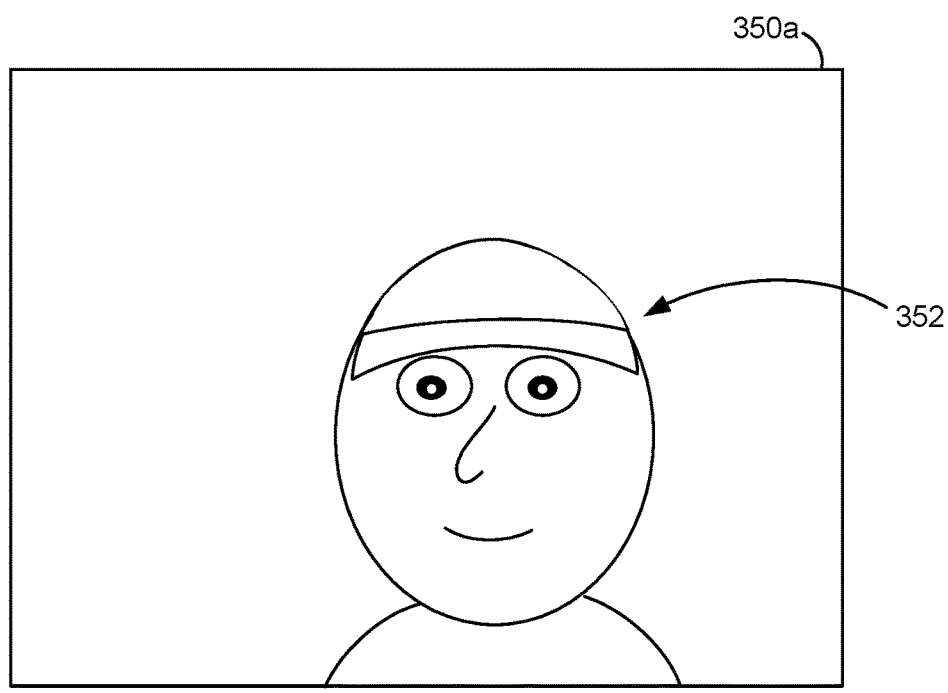
FIG. 3B illustrates an authentication image, in accordance with some embodiments.
Figure 4:
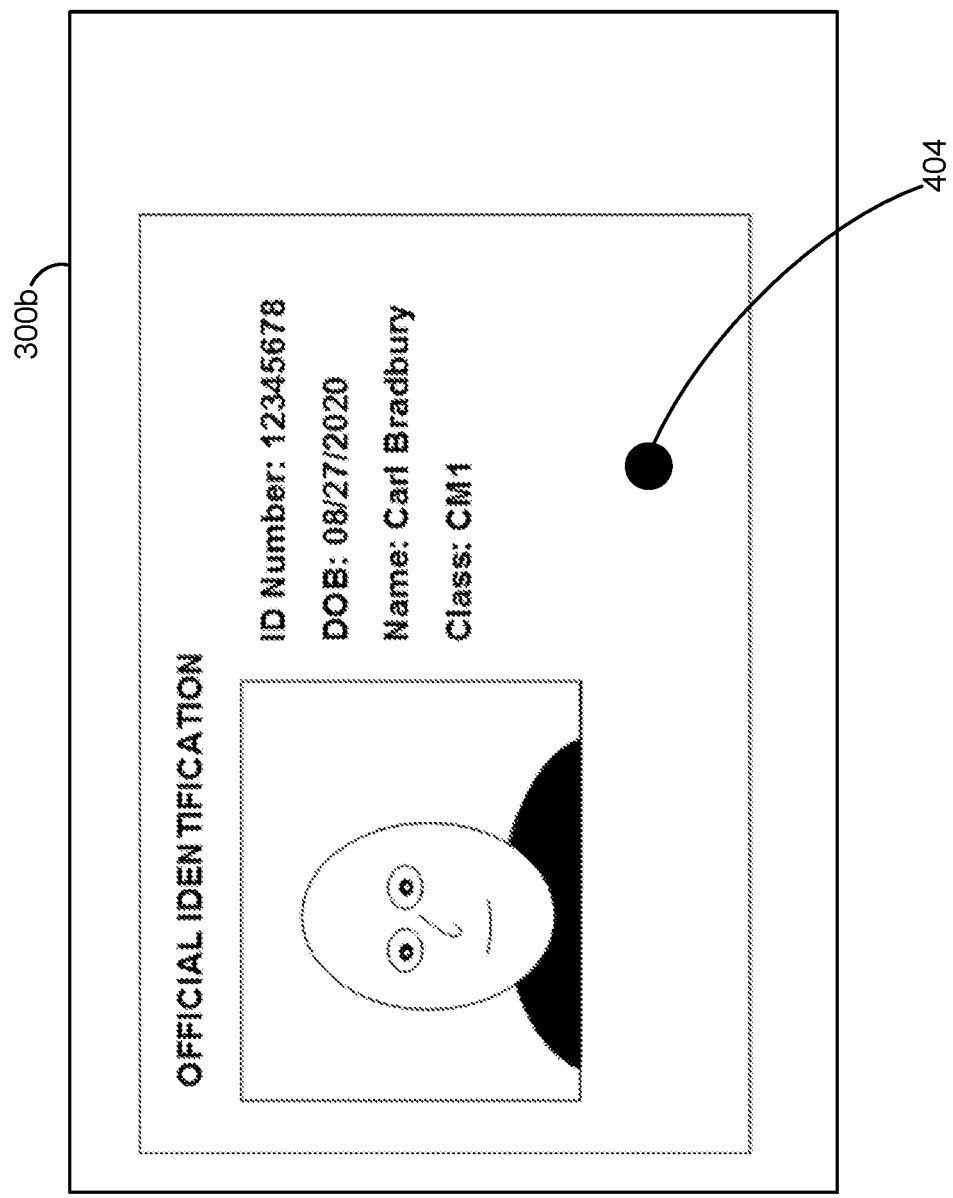
FIG. 4 illustrates an example of a reference image that includes a fault, in accordance with some embodiments.
Figure 5:
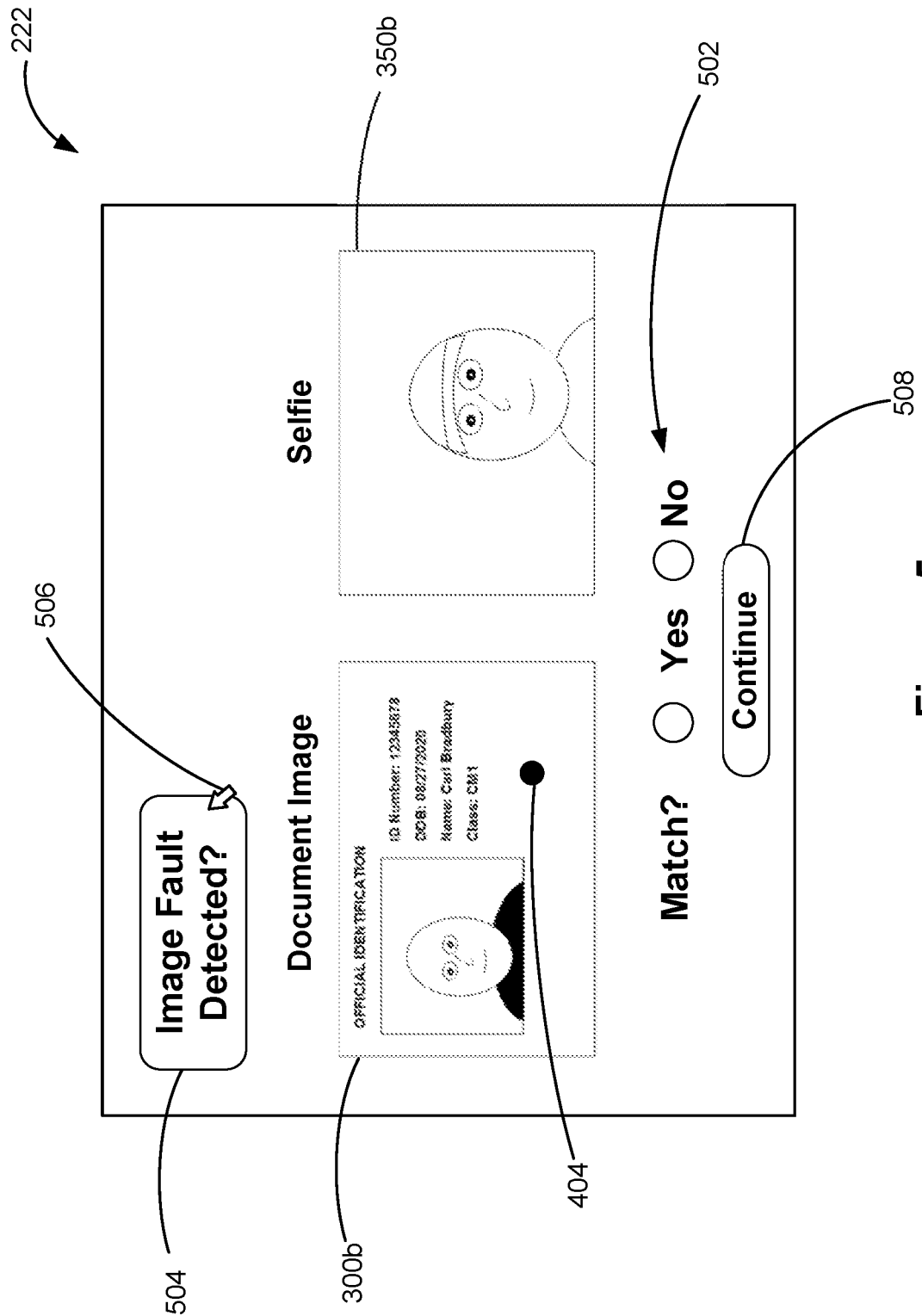
FIGS. 5-9 illustrate a validation user interface that receives fault tagging input, in accordance with some embodiments.
Figure 10:
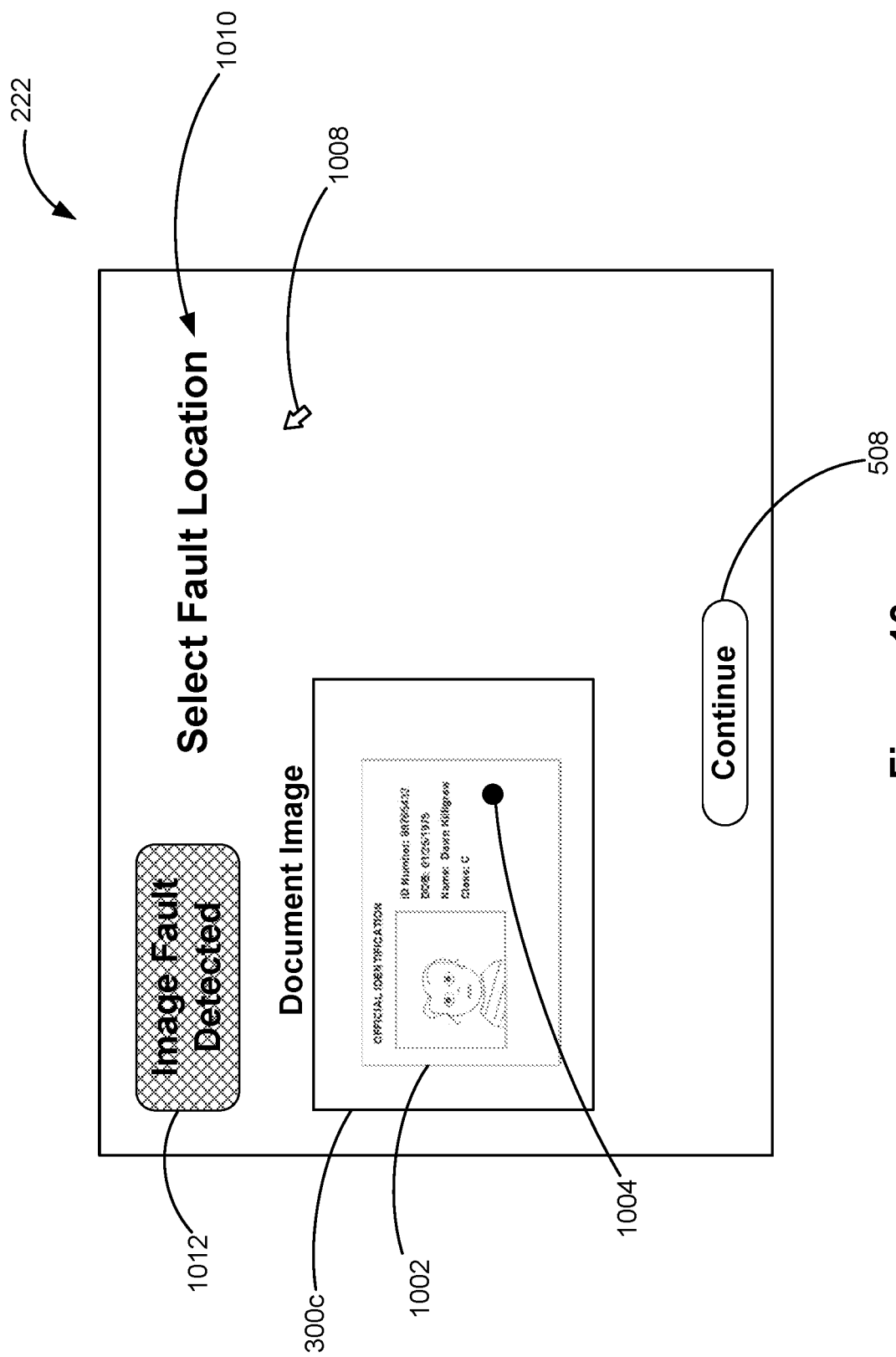
FIGS. 10-11 illustrate a validation user interface that is displayed to a user in accordance with a determination that a validation value determined for a reference image meets review criteria, in accordance with some embodiments.
Figure 13:
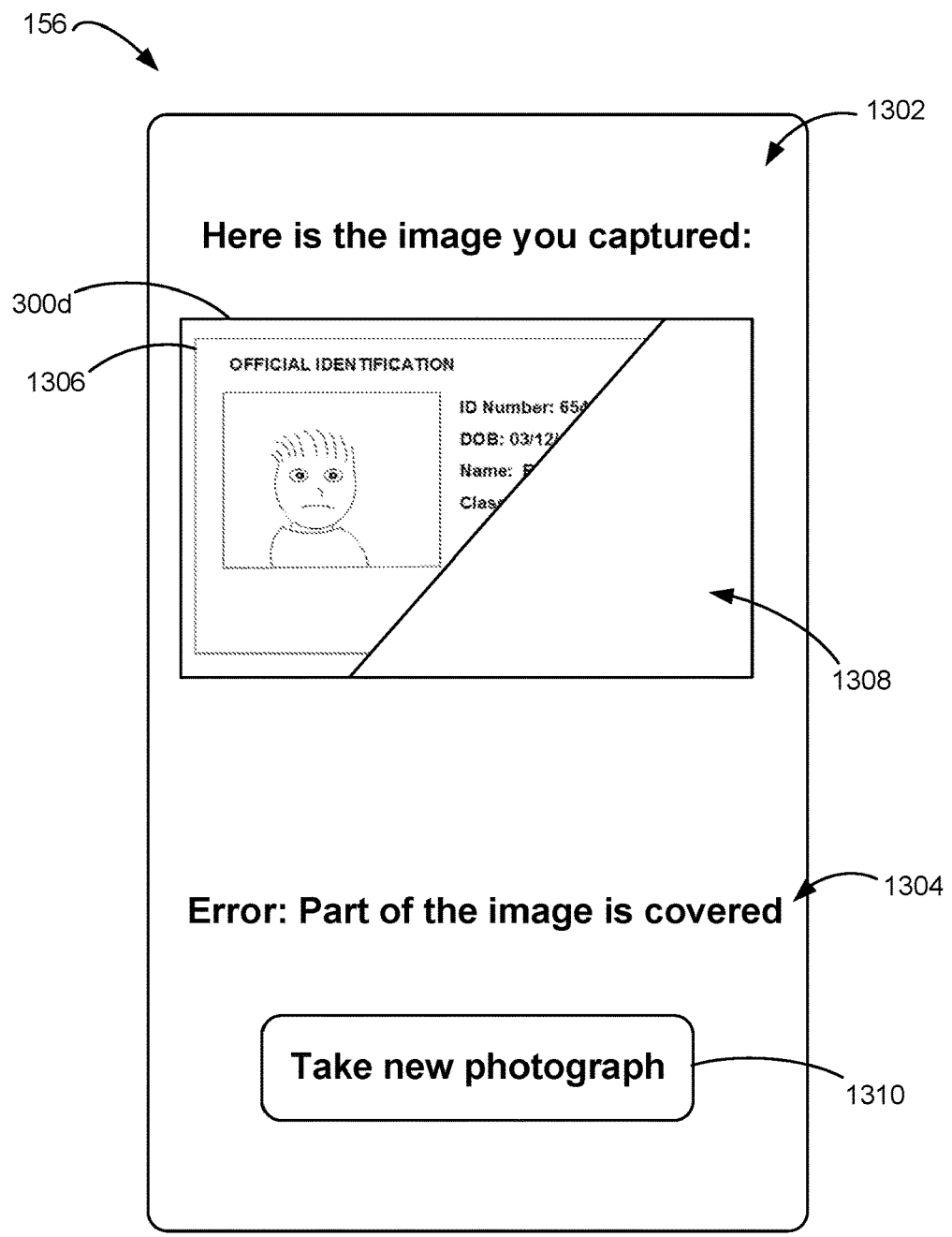
FIG. 13 illustrates a user device that displays a camera user interface that includes feedback regarding an image captured by a camera of the user device.

In some embodiments, an authentication request includes a reference image 300 (e.g., 300*a*, as illustrated in FIG. 3A, 300*b*, as illustrated in FIG. 4, 300*c* as illustrated in FIG. 10, or 300*d*, as illustrated in FIG. 13). For example, reference image 300 is an image of an identification document for a user 124). In some embodiments, an authentication request includes an authentication image 350 (e.g., 350*a*, as illustrated in FIG. 3B). For example, authentication image 350 is an image, series of images, and/or video of the user 124 captured by a user device 156, such as a recent "selfie" of the user 124. In some embodiments, an authentication request includes an authentication image 350 and the authentication system locates a reference image 300 that corresponds to the user 124 that provided the authentication image 350.

In some embodiments, the authentication server 100 causes a validation device 201 to display all or a part of a reference image 300 and/or all or a part of an authentication image 350 for human review. In some embodiments, the validation device 201 receives input that corresponds to a determination of whether authentication is successful (e.g., based on whether reference image 300 is sufficiently similar to the authentication image 350). In some embodiments, validation device 201 transmits validation information 128 that corresponds to a determination of whether authentication is successful (e.g., indicating that a reference image 300 is a match for authentication image 350, indicating that reference image 300 is not a match for authentication image 350, and/or indicating that a fault was detected in reference image 300 and/or authentication image 250).

Figure 2:
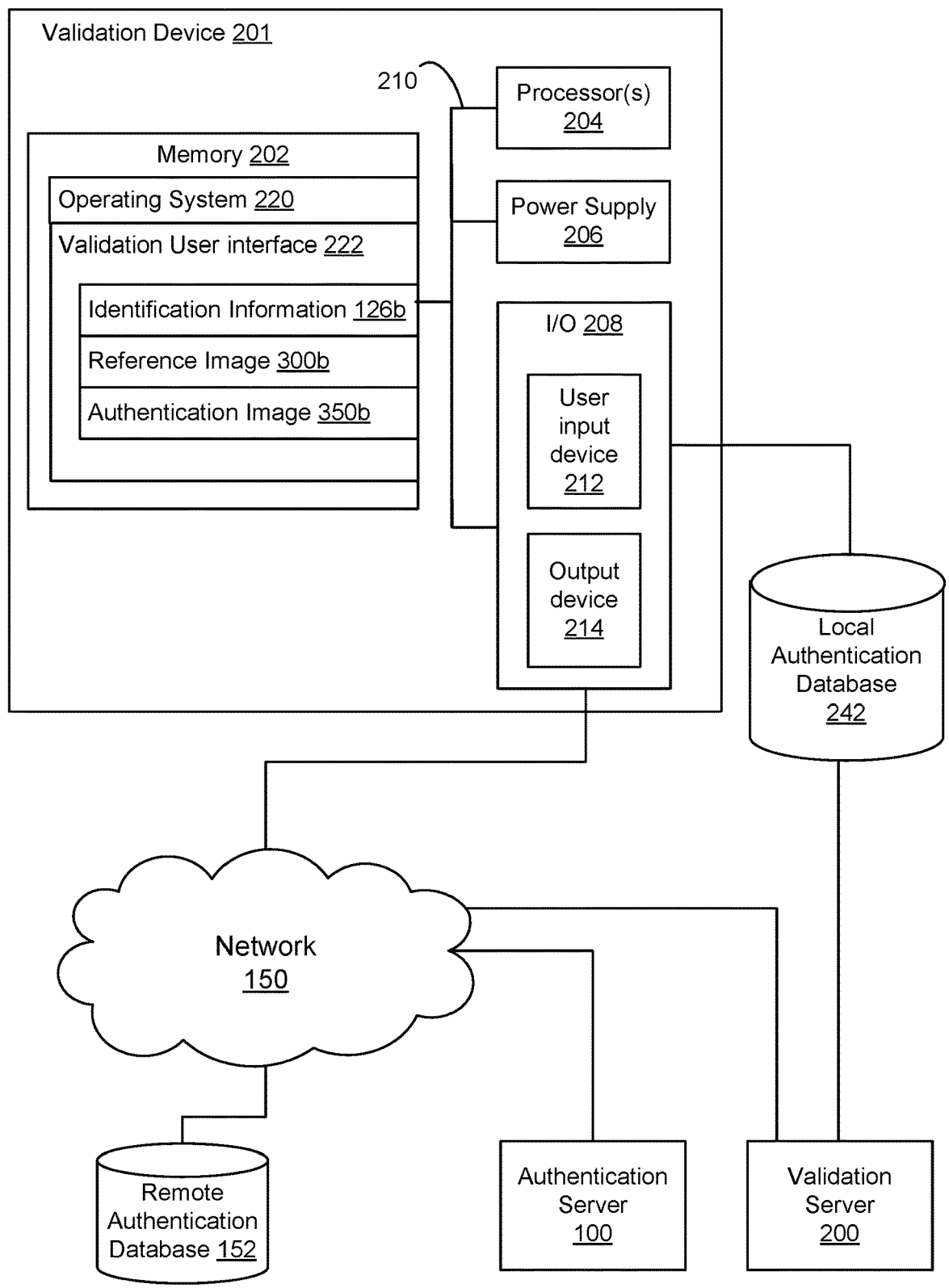
FIG. 2 is a system diagram of a verification device, in accordance with some embodiments.

FIG. 2 is a system diagram of a validation device 201 that displays validation information and/or receives validation input, in accordance with some embodiments. The validation device 201 typically includes a memory 202, one or more processor(s) 204, a power supply 206, an input/output (I/O) subsystem 208, and a communication bus 210 for interconnecting these components. In some embodiments, validation device 201 is coupled to a validation server 200 (e.g., that receives data from authentication server 100, transmits data to authentication server 100, and/or manages validation device(s) 201 (e.g., by transmitting data to validation device(s) 201 and/or receiving data from validation device(s) 201)). In some embodiments, validation device(s) 201 are managed by authentication server 100 (e.g., including transmitting data to authentication server 100 and/or receiving data from authentication server 100).

The processor(s) 204 execute modules, programs, and/or instructions stored in the memory 102 and thereby perform processing operations.

In some embodiments, the memory 202 stores one or more programs (e.g., sets of instructions) and/or data structures, collectively referred to as "modules" herein. In some embodiments, the memory 202, or the non-transitory computer readable storage medium of the memory 202 stores the following programs, modules, and data structures, or a subset or superset thereof:
- an operating system 220; and
- a validation user interface 222, which displays information (e.g., identification information 126*b*, a reference image 300*b* and/or an authentication image 350*b*) and/or includes one or more input controls for receiving validation input.

The above identified modules (e.g., data structures, and/or programs including sets of instructions) need not be implemented as separate software programs, procedures, or modules, and thus various subsets of these modules may be combined or otherwise re-arranged in various embodiments. Furthermore, the memory 202 may store additional modules not described above. In some embodiments, the modules stored in the memory 202, or a non-transitory computer readable storage medium of the memory 202, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 204. In some embodiments, one or more of the modules described with regard to the memory 202 is implemented in the memory 102 of a server computing system 100 (FIG. 1) and executed by the processor(s) 104 of the server computing system 100.

In some embodiments, the I/O subsystem 208 communicatively couples the validation device 201 to one or more devices (e.g., user input device 212, output device 214, and/or server computer system 100) via a communications network 150 and/or via a wired and/or wireless connection.

In some embodiments, a user input device 212 and/or an output device 214 are integrated with validation device 201 (e.g., as a touchscreen display). In some embodiments, user input device 212 and/or output device 214 are peripheral devices communicatively connected to validation device 201. In some embodiments, a user input device 212 includes a keyboard and/or a pointer device such as a mouse, touchpad, and/or stylus. In some embodiments, output device 214 includes, for example, a display and/or a speaker.

In some embodiments, validation user interface 222, user input device 212, and/or output device 214 are incorporated into server computer system 100 (e.g., rather than being implemented in a separate validation device 201).

The communication bus 210 optionally includes circuitry (sometimes called a chipset) that interconnects and controls communications between system components.

In some embodiments, validation device 201 (and/or authentication server 100) displays, by a validation user interface 222 displayed by output device 214, identification information 126, reference image 300, and/or authentication image 350. In some embodiments, a reviewer viewing validation user interface 222 provides input to validation device via user input device 212. The input provided by the reviewer includes, for example, information regarding the validity of reference image 300 (e.g., the results of one or more validity checks for reference image 300), information regarding the validity of authentication image 350 (e.g., the results of one or more validity checks for authentication image 350), and/or information regarding the similarity of reference image 300 and authentication image 350 (e.g., the results of one or more similarity checks for reference image 300 and authentication image 350).

FIG. 3A illustrates a reference image 300*a*, in accordance with some embodiments. Reference image 300*a* is, for example, an image of an identification document 302 that includes a facial image 304 of a user. For example, reference image 300*a* is an image of an identification card, a driver's license, a passport, a financial instrument (e.g., credit card or debit card), or a facility access card.

FIG. 3B illustrates an authentication image 350*a* that includes a facial image 352 of the user, in accordance with some embodiments. For example, authentication image 350*a* is a "selfie" captured using user device 156. Authentication image 350*a* is, e.g., a still image or an image extracted from a video. In some embodiments, the authentication image 350*a* includes a series of images or a video (e.g., used for determining that the authentication image 350 meets liveness requirements).

FIG. 4 illustrates an example of a reference image 300*b* that has been captured of the reference document 302 after the reference document 302 has been punched (as indicated by the puncture hole 404 that is visible in reference image 300*b*).

FIGS. 5-9 illustrate a validation user interface 222 that receives fault tagging input, in accordance with some embodiments. In some embodiments, validation user interface 222 is displayed by output device 214 to a human reviewer (e.g., to facilitate review of authentication information for an authentication request).

In some embodiments, validation user interface 222 includes reference image 300*b* and/or authentication image 350*b* (e.g., to allow a reviewer to compare the images and determine whether the images match). For example, in FIG. 5, validation user interface 222 includes reference image 300*b*, authentication image 350*b*, and a match control 502 (e.g., receive reviewer input indicating whether or not reference image 300*b* in a match for authentication image 350b). In some embodiments, validation user interface 222 includes a progression control 508 (e.g., for advancing to a subsequent set of authentication review data, a subsequent interface and/or a subsequent stage of validation user interface 222). For example, in a case where no image fault is present in reference image 300b or authentication image 350b, a human reviewer may use match control 502 to indicate whether or not authentication image 350b is a match for reference image 300b and then use progression control 508 to advance to a subsequent authentication review.

In some embodiments, validation user interface 222 includes one or more controls for indicating that the human reviewer has detected a fault and/or for identifying a fault. For example, in FIG. 5, validation user interface 222 includes an image fault detection control 504 (e.g., a selectable button) that, when activated, causes validation device 201 to store and/or transmit data indicating that a fault has been detected. In some embodiments, activation of fault detection control 504 initiates a fault location indication mode. For example, in FIG. 5, because reference image 300b includes an indication of a puncture hole 404, the human reviewer has provided input using a user input device 212 (e.g., as indicated by pointer 506) at a location that corresponds to image fault detection control 504.

Figure 6:
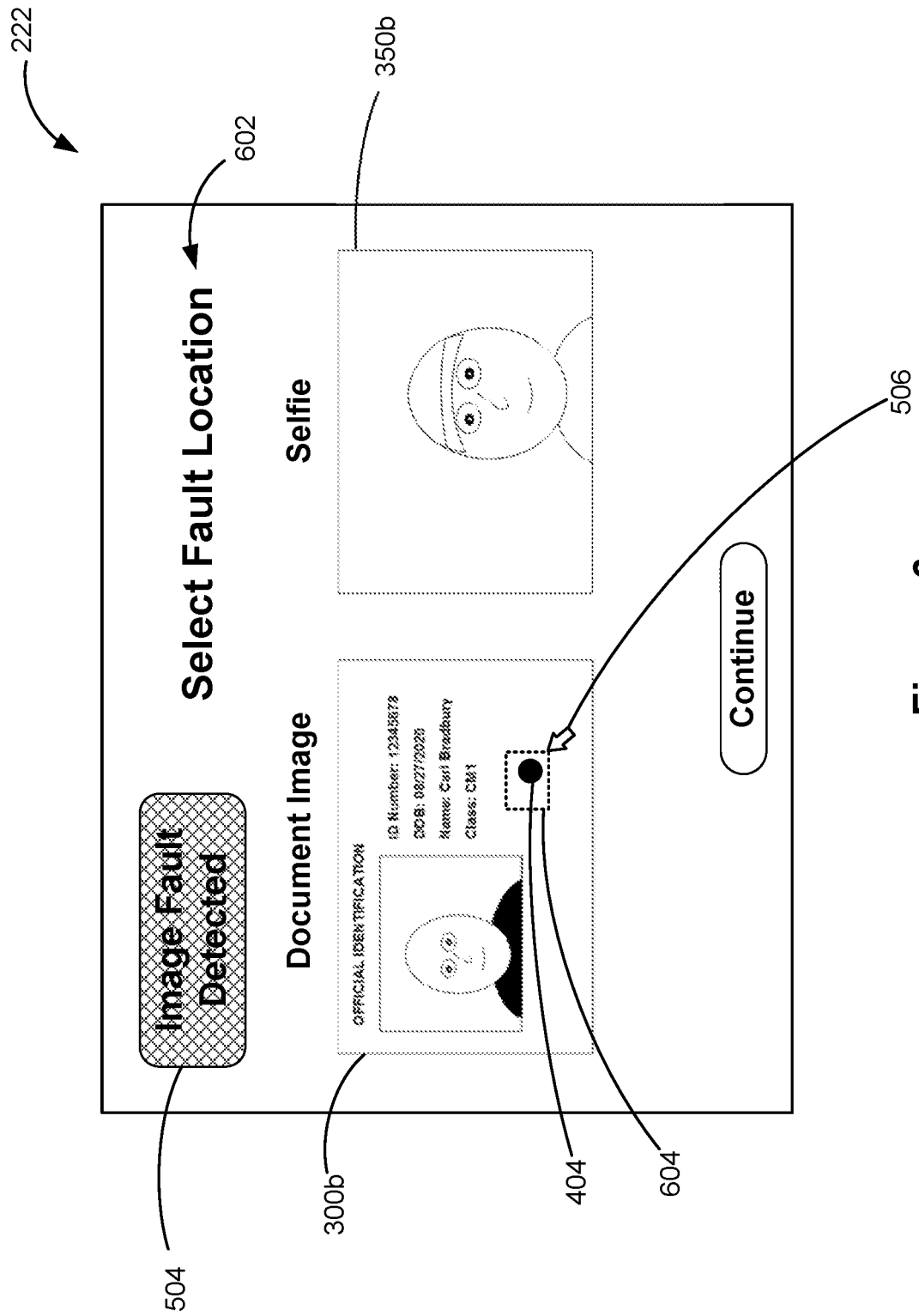

In FIG. 6, in response to detection of the user input at the location that corresponds to image fault detection control 504, a fault location indication stage of validation user interface 222 has been displayed. In some embodiments, validation user interface 222 (e.g., image fault detection control 504) and/or pointer 506 is visually altered to indicate that fault location indication mode is active. In some embodiments, validation user interface 222 displays instructions to select the fault location, as indicated at 602. User input device 212 has been used to select a region that corresponds to punch mark 404, as indicated by the selection box 604. In some embodiments, multiple fault regions may be selected in reference image 300b and/or in authentication image 350b.

Figure 7:
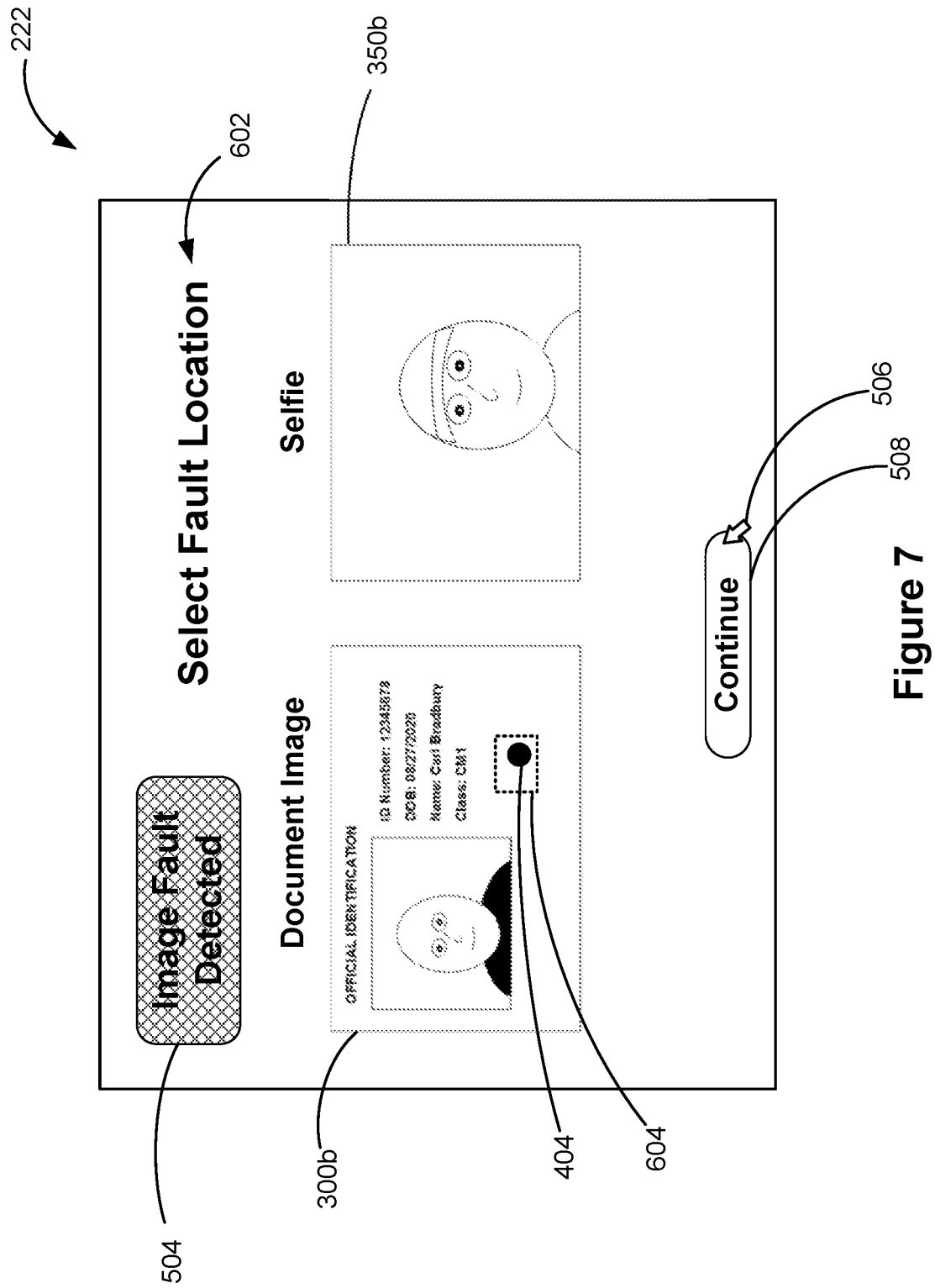

In FIG. 7, while the region that corresponds to the image fault (e.g., punch 404) is selected, input by user input device 212 is detected at a location that corresponds to progression control 508 (e.g., while pointer 506 is at the location that corresponds to progression control 508).

Figure 8:
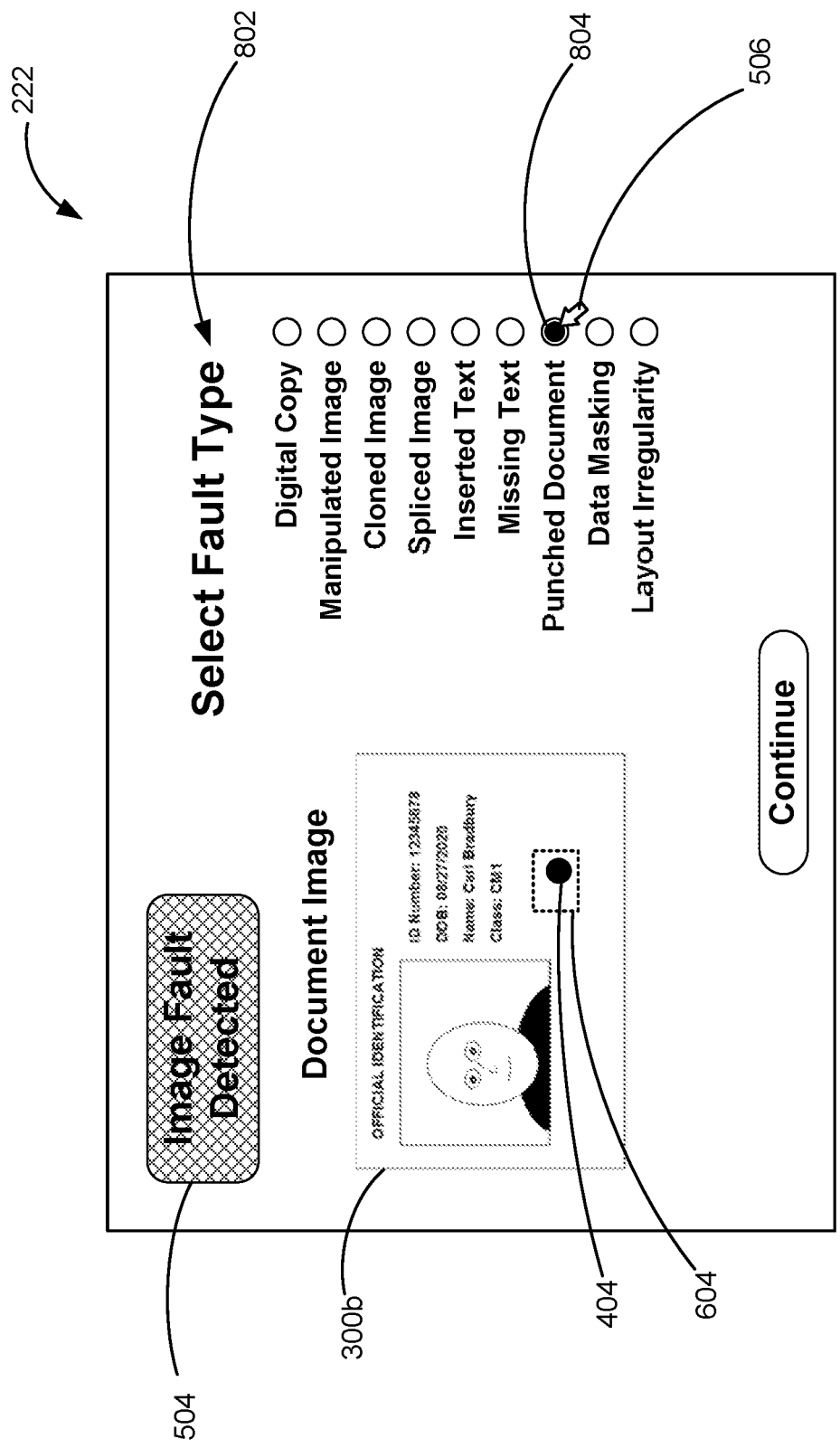

In FIG. 8, in response to detection of the input by user input device 212 at the location that corresponds to progression control 508, a fault type identification stage of validation user interface 222 has been displayed. In some embodiments, in the fault type identification stage of validation user interface 222, a plurality of fault types (e.g., as discussed further below with regard to operation 1206) are displayed as selectable options. In some embodiments, validation user interface 222 displays instructions to select the fault type, as indicated at 802. In FIG. 8, an input by the human reviewer has selected the "punched document" fault type, as indicated by the "selected" state of toggle 804. In some embodiments, multiple fault types may be assigned to a fault identified in a selected fault region (e.g., as indicated by selection box 604).

Figure 9:
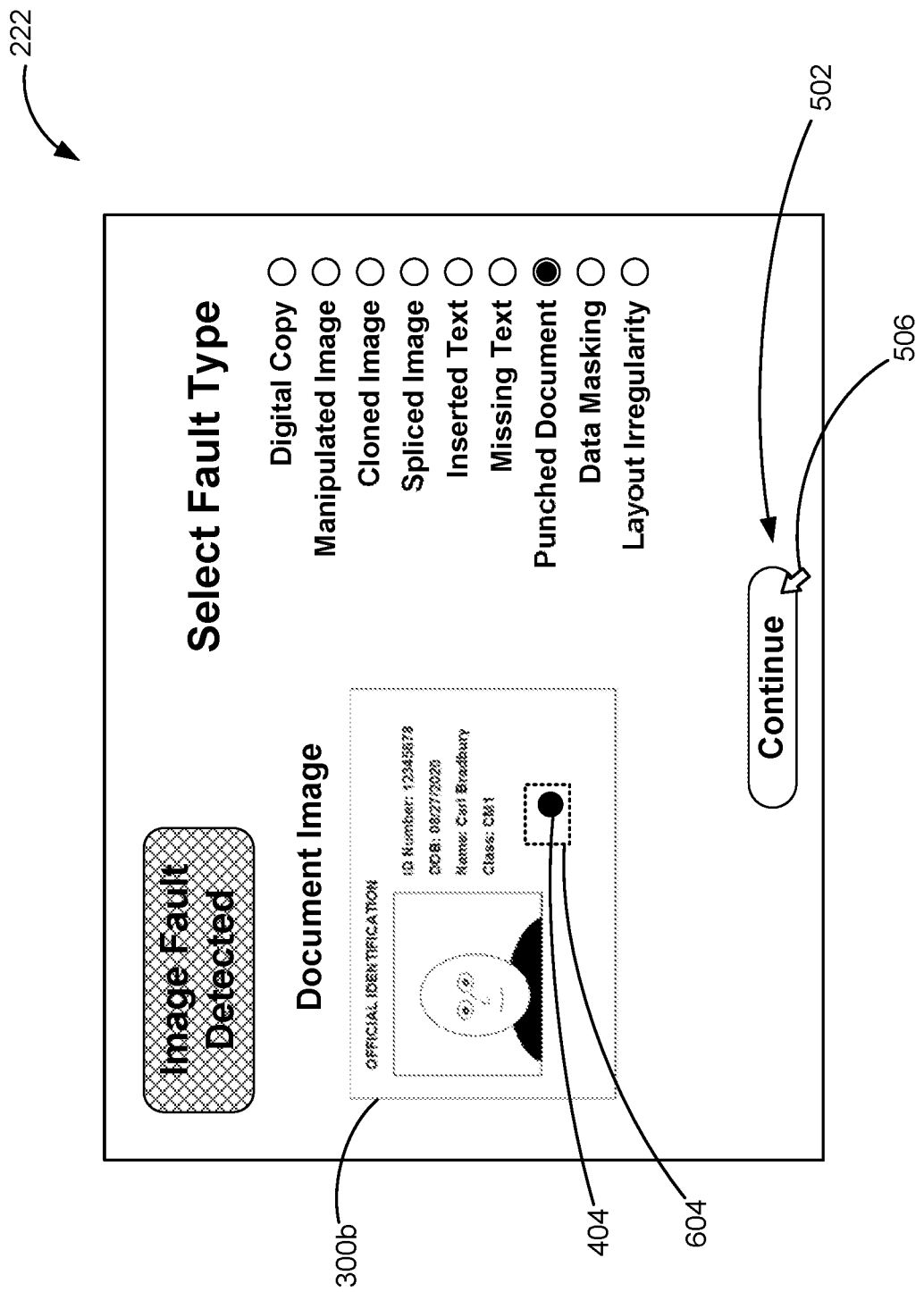

In FIG. 9, while the fault type that corresponds to the image fault is selected, input by user input device 212 is detected at a location that corresponds to progression control 508 (e.g., while pointer 506 is at the location that corresponds to progression control 508). In some embodiments, in response to detection of the input at the location that corresponds to progression control 508, validation information 128 is transmitted from validation device 201 to authentication server 100 (e.g., for use by machine learning module 126). For example, the validation information 128 includes the image 300b, information indicating the fault type identified as described with regard to FIG. 8, and/or information indicating the region selected by selection box 604.

It will be recognized that the description of validation user interface 222 provided with reference to FIGS. 5-9 is one illustrative example of an approach to a user interface for image fault tagging, and that various controls, inputs, and/or sequences of operations are used in accordance with various embodiments for human tagging of image faults. For example, in some embodiments, an indication that an image fault has been detected may be provided by selection of at least a portion of reference image 300b or at least a portion of authentication image 350b (e.g., without display and/or activation of a control 504 for indicating detection of an image fault).

In some embodiments, the machine learning module 126 includes a supervised training module 130 that uses image fault data generated by human reviewers (e.g., as described with regard to FIG. 5-9) to train authentication model 136 to identify image faults. For example, the machine learning module 126 uses the human-tagged image fault data to generate rules of an authentication model 136 for determining the presence and/or the location of faults in images included in an authentication request 124. In some embodiments, the machine learning module 126 applies the generated authentication model 136 to perform image analysis (e.g., using computer vision techniques) for identifying image faults in images (such as a reference image 300 and/or an authentication image 350) of a received authentication request 124. In some embodiments, in accordance with a determination by machine learning module 126 that a fault is present in an image, the image that includes the fault is displayed to a human reviewer for further review (e.g., with a prompt to identify a location of fault). In some embodiments, in accordance with a determination by machine learning module 126 that no fault is present in an image, the image that includes the fault is displayed to a human reviewer for further review (e.g., with a prompt to identify a location of fault). In some embodiments, the human input is fed back into the supervised machine learning system.

In some embodiments, the machine learning module 126 analyzes a set of incoming authentication requests 124 (e.g., authentication requests received during a predetermined window of time). In some embodiments, machine learning module 126 includes an unsupervised training module 132 that trains authentication model 136 using the set of incoming authentication requests without using human-tagged validation information (e.g., in addition to or in lieu of a supervised training module 130 that trains authentication model 136 using human-tagged validation information (e.g., as described with regard to FIGS. 5-9)).

In some embodiments, the machine learning module 126 generates multiple authentication models 136. For example, a respective authentication model 136 is customized based on one or more parameters (e.g., as defined for an entity (e.g., bank, merchant, and/or class of users), type of device, type of identification, and/or type of transaction).

In some embodiments, the machine learning module 126 determines a subset of the set of incoming authentication requests 124 that correspond to invalid authentication request activity (e.g., authentication requests that are reported for fraud or that are determined to include a fault). In some embodiments, the unsupervised training module 132 determines that, in the subset of the set of incoming authentication requests 124, a number of invalid authentication requests exceeds a threshold number of invalid submissions and/or a rate of fraudulent activity exceeds a threshold level.

In some embodiments, a validation fault (e.g., the second validation fault described with regard to operation 1430, described with regard to FIG. 14 below) is an invalidity characteristic (e.g., an indication of an internet protocol (IP) address, geographical area, device type (e.g., a model that is no longer available), camera type, document type, transaction type, time at which request is received, and/or verification outcome) of the subset of the set of incoming authentication requests. In some embodiments, weights are applied to the first validation fault, the second validation fault, and/or any additional validation faults. In some embodiments, weights are adjusted over time (e.g., in response to regional activity, transaction types determined to be problematic, etc.).

Figure 11:
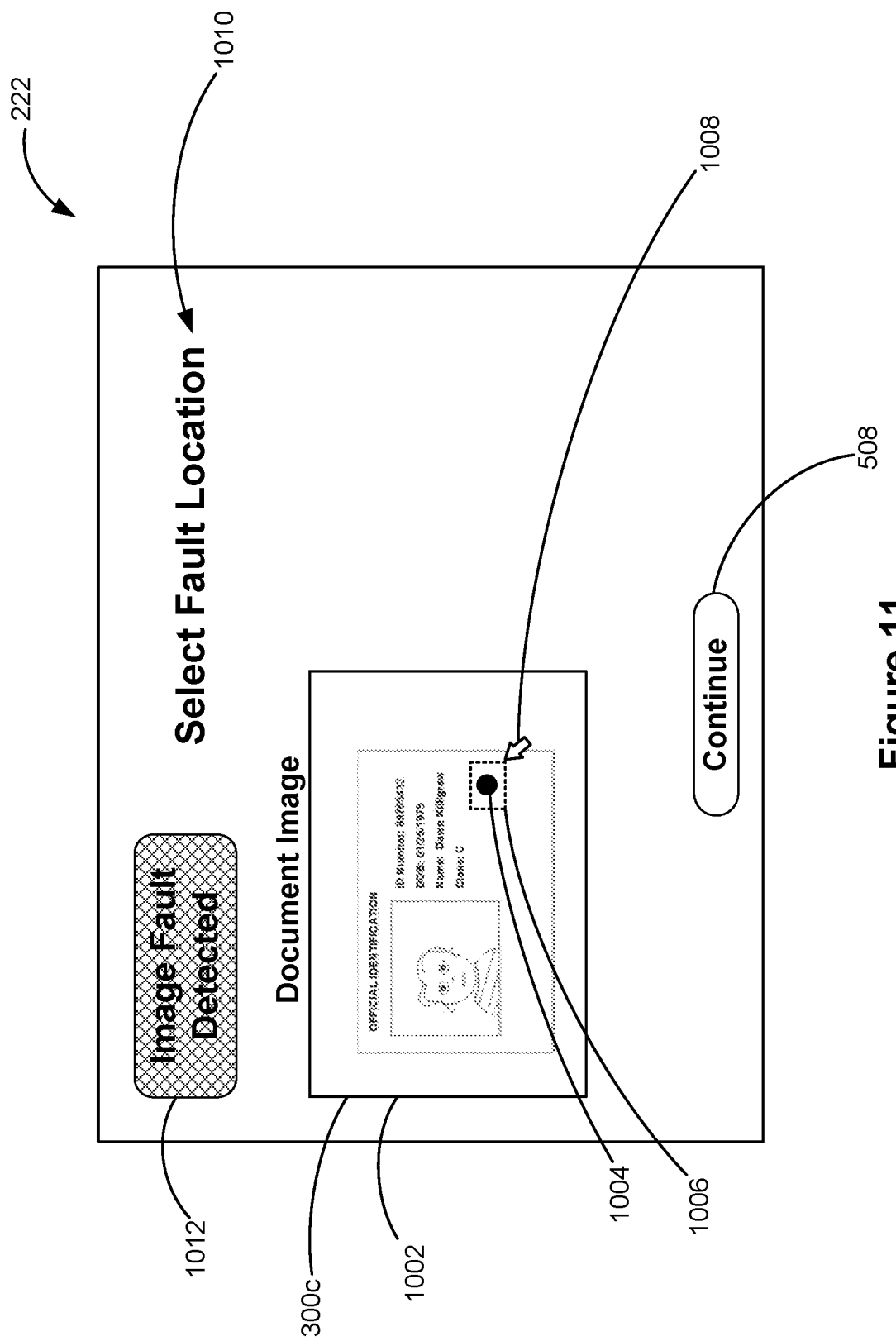

FIGS. 10-11 illustrate a validation user interface 222 that is displayed to a user in accordance with a determination that a validation value determined for reference image 300c meets review criteria, in accordance with some embodiments. For example, machine learning module 126 has determined that a fault is present in reference document 1002 captured in image 300c (e.g., reference document 302 has been punched, as indicated by punch mark 1004). In some embodiments, validation user interface 222 is displayed by output device 214 to a human reviewer. For example, in FIG. 10 the validation user interface 222 is displayed to the human reviewer with an image fault detected label 1012 and a task prompt 1010 (e.g., prompting the reviewer to confirm presence of the fault and/or to identify a location of the fault).

In FIG. 11, user input device 212 has been used (e.g., as indicated by pointer 1008) to select a region (e.g., as indicated by the selection box 1006) that corresponds to the image fault (e.g., punch mark 1004).

In some embodiments, a machine learning system is used to analyze images captured by a user device 156 to provide feedback regarding the captured image at the mobile device. For example, the feedback is provided prior to generation of an authorization request.

Figure 12:
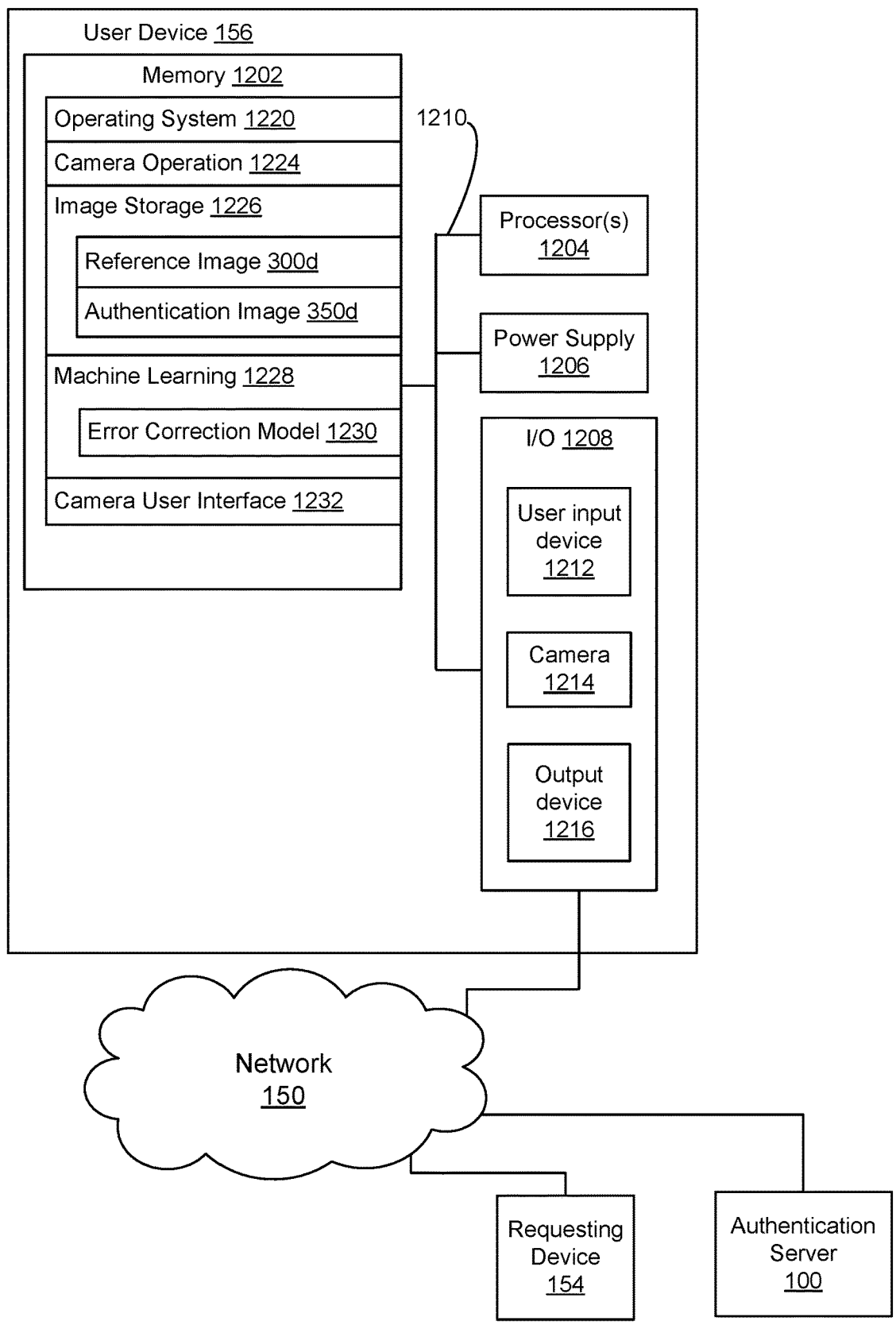
FIG. 12 is a system diagram of a user device that captures a reference image and/or an authentication image, in accordance with some embodiments.

FIG. 12 is a system diagram of user device 156 (e.g., a device that includes and/or is connected to a camera, such as a personal computer or mobile device) that captures a reference image 300d and/or an authentication image 350d, in accordance with some embodiments. The user device 156 typically includes a memory 1202, one or more processor(s) 1204, a power supply 1206, an input/output (I/O) subsystem 1208, and a communication bus 1210 for interconnecting these components.

The processor(s) 1204 execute modules, programs, and/or instructions stored in the memory 1202 and thereby perform processing operations.

In some embodiments, the memory 1202 stores one or more programs (e.g., sets of instructions) and/or data structures, collectively referred to as "modules" herein. In some embodiments, the memory 1202, or the non-transitory computer readable storage medium of the memory 1202, stores the following programs, modules, and data structures, or a subset or superset thereof:

an operating system 1220;
a camera operation module 1224 that controls camera functioning (e.g., image capture by camera 1214 and and/or one or more camera parameters of camera 1214);
image storage module 1226 that stores images captured by camera 1214 (e.g., captured reference image 300d and/or a captured authentication image 350d);
a machine learning module 1228 that includes an error correction model 1230 for analyzing captured images to determine presence of image errors; and
a camera user interface 1232 that displays captured images (e.g., captured reference image 300d and/or a captured authentication image 350d) and/or displays feedback to a user regarding the captured images.

The above identified modules (e.g., data structures, and/or programs including sets of instructions) need not be implemented as separate software programs, procedures, or modules, and thus various subsets of these modules may be combined or otherwise re-arranged in various embodiments. Furthermore, the memory 1202 may store additional modules not described above. In some embodiments, the modules stored in the memory 1202, or a non-transitory computer readable storage medium of the memory 1202, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 1204.

In some embodiments, one or more of the modules described with regard to the memory 1202 (for example, the machine learning module 1228) is implemented in the memory 102 of authentication server 100 (FIG. 1) and executed by the processor(s) 104 of the server computing system 100. For example, authentication server 100 uses machine learning module 1228 and/or machine learning module 126 to analyze a plurality of authorization requests 124 and/or to generate error correction module 1230. In some embodiments, error correction model 1230 and/or updates to error correction model 1230 are transmitted from authentication server 100 to user device 156. In some embodiments, images captured by user device 156, including images that include errors, are transmitted by user device 156 to authentication server 100 (e.g., for training error correction module 1230 and/or included in an authentication request). In some embodiments, images captured by user device 156 are used by machine learning module 1228 executing on user device 156 to train error correction model 1230. In some embodiments, error correction model 1230 is applied by user device 156 to an image captured by user device 156 (e.g., to provide feedback to a user regarding the quality of the captured image and/or any faults detected in the captured image). In some embodiments, error correction model 1230 is applied to a set of images, a human reviewer reviews the same set of images (e.g., using validation device 200), and error correction model 1230 is updated based on inconsistencies between the human review results and error correction model results (e.g., difference in confidence level exceeding a threshold inconsistency value).

In some embodiments, the I/O subsystem 1208 communicatively couples the validation device 1202 to one or more devices (e.g., user input device 1212, camera 1214, and/or output device 1216) via a communications network 150 and/or via a wired and/or wireless connection. In some embodiments, a user input device 1212 and/or an output device 1216 are integrated with user device 156 (e.g., a touchscreen display). In some embodiments, user input device 1212 and/or output device 1216 are peripheral devices communicatively connected to user device 156. In some embodiments, a user input device 1212 includes a keyboard and/or a pointer device such as a mouse, touchpad, and/or stylus. In some embodiments, user input device 1212 includes a microphone. In some embodiments, output device 1216 includes a display and/or a speaker.

The communication bus 1210 optionally includes circuitry (sometimes called a chipset) that interconnects and controls communications between system components.

FIG. 13 illustrates a user device 156 that displays a camera user interface 1232 that includes feedback (e.g., a feedback message 1304) regarding an image (e.g., reference image 300*d*) captured by a camera of user device 156. For example, the displayed user interface 1302 includes a reference image 300*d* in which reference document 1306 is partially covered, as indicated by the blank space at 1308. In some embodiments, user device 156 applies an error correction model 1230 to analyze a captured image (e.g., after capturing the image). In some embodiments, user device 156 transmits a captured image to authentication server 100, authentication server 100 uses error correction model 1230 to analyze the captured image, and authentication server 100 transmits image error information to user device 156.

In some embodiments, in accordance with a determination that one or more errors are identified in a captured image (e.g., one or more errors indicated in image error information received from authentication server 100 and/or one or more errors determined by user device 156 using error correction model 1230), camera operation module 1224 adjusts one or more parameters of camera 1214 that correspond to at least one of the one or more errors. For example, in accordance with a determination that a glare error is identified in a captured image, camera operation module 1224 disables the flash. In some embodiments, camera operation module 1224 adjusts one or more camera parameters and (e.g., subsequently) automatically captures a new image.

In some embodiments, in accordance with a determination that one or more errors are identified in a captured image, camera user interface 1232 displays a control (e.g., image re-capture button 1310) for capturing a new image. For example, user device 156 displays image re-capture button 1310 that, when activated (e.g., by a contact on a touchscreen display of user device 156 that corresponds to a location of image re-capture button), causes a new image to be captured by the camera of user device 156 and/or that causes a camera operation user interface (not shown) to be displayed.

Figure 14A:
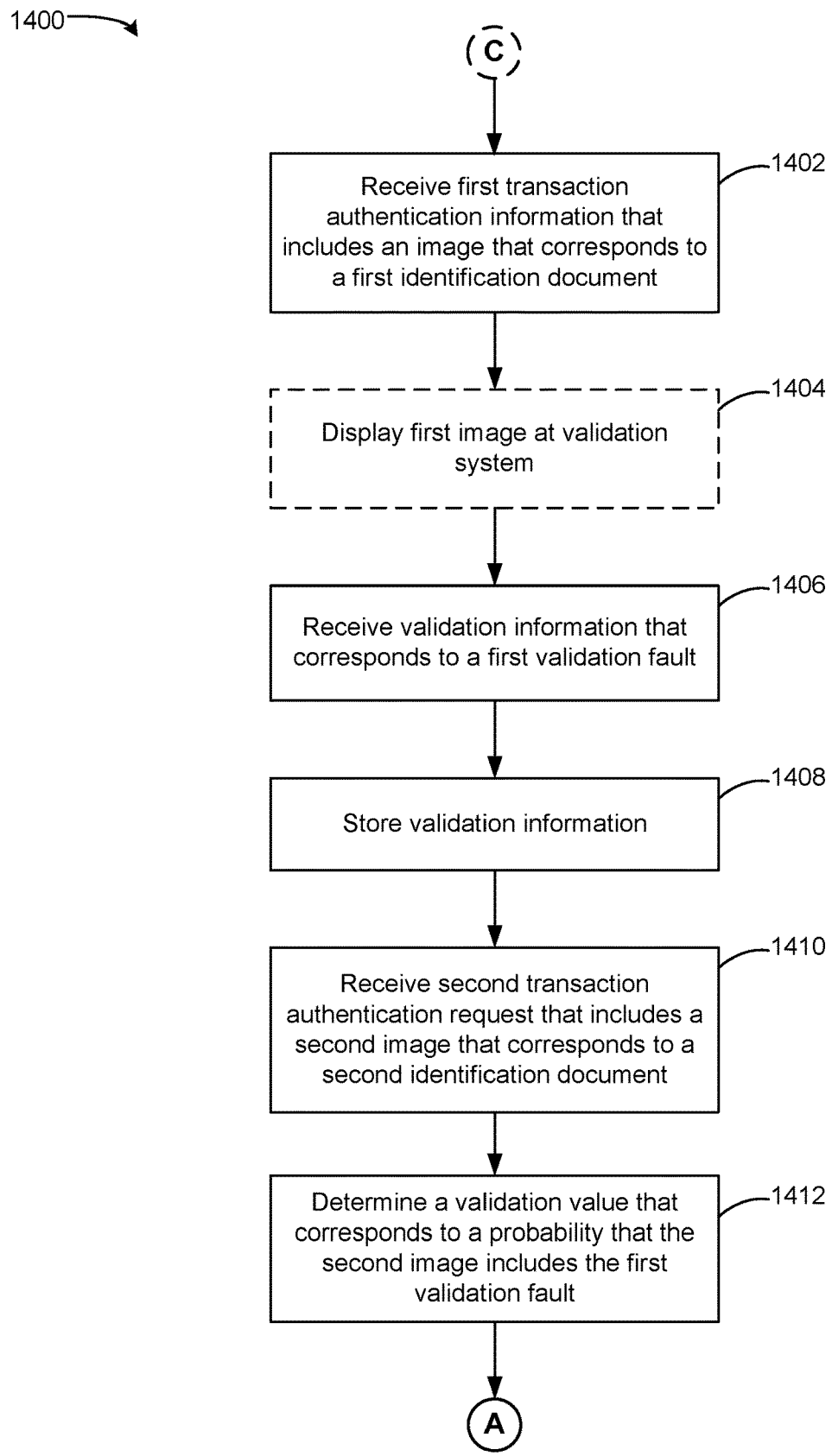
FIGS. 14A-14C are a flow diagram illustrating a method for using machine learning to generate an authentication model for analyzing image data, in accordance with some embodiments.
Figure 14B:
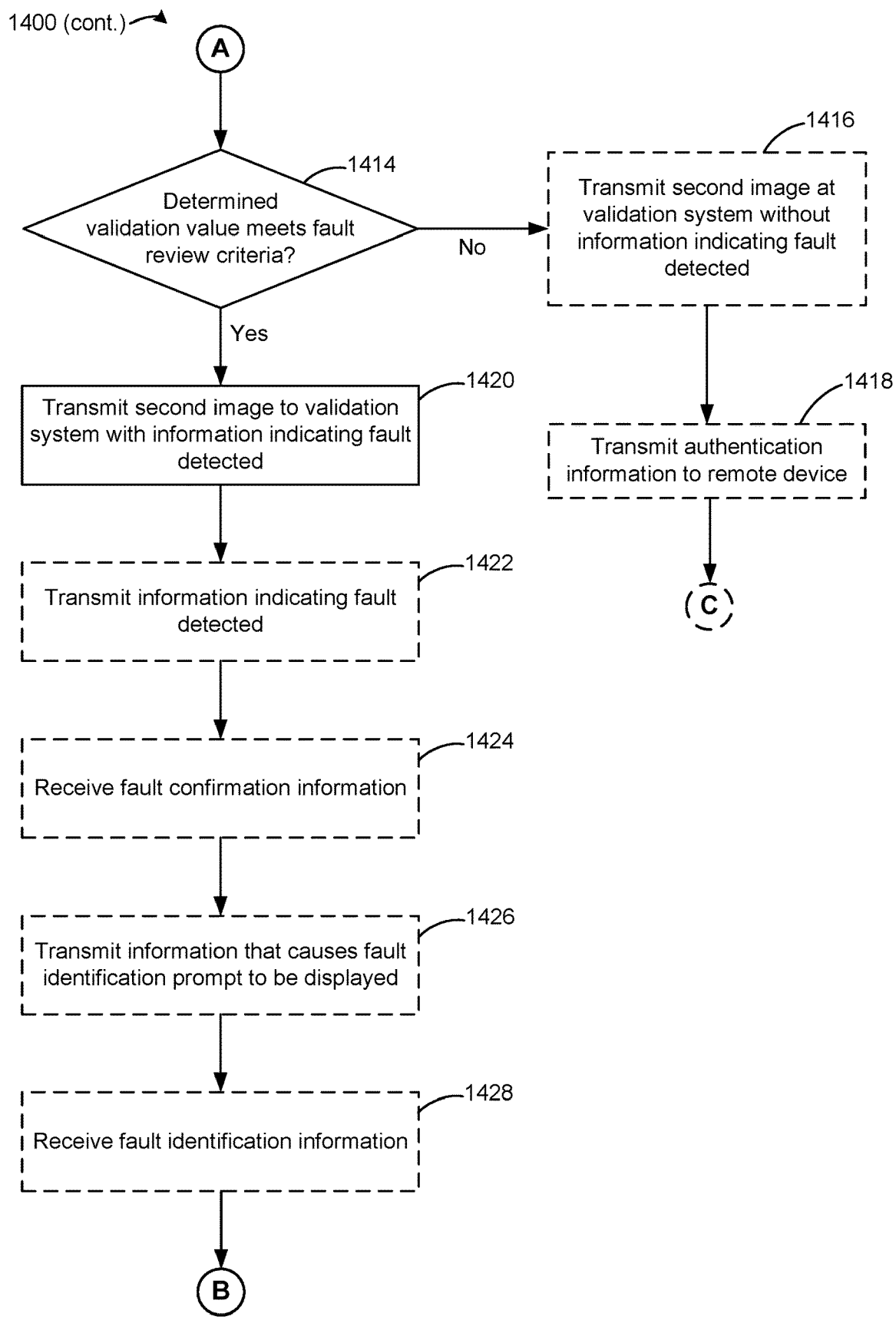
Figure 14C:
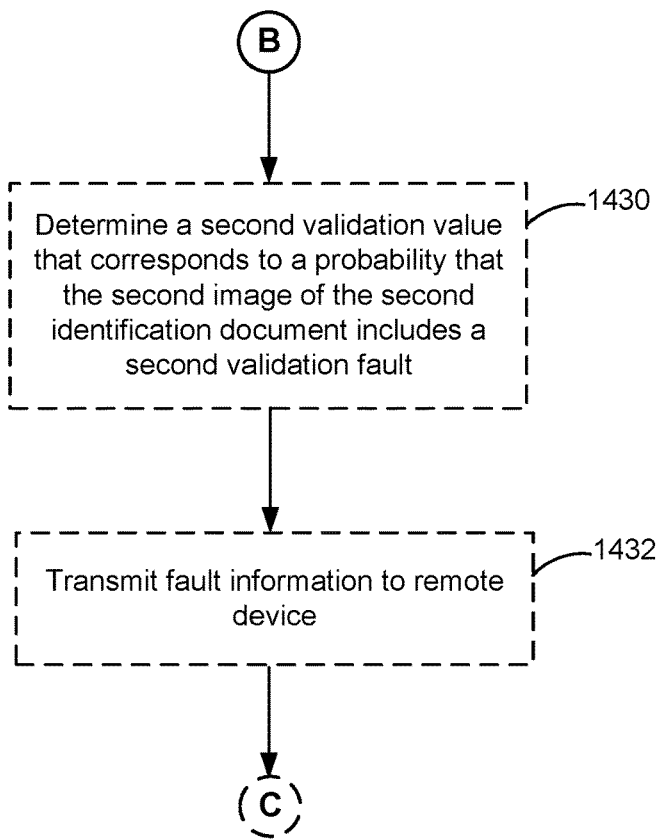

FIGS. 14A-14C are a flow diagram illustrating a method 1400 for using machine learning to generate an authentication model 136 for analyzing image data, in accordance with some embodiments. The method is performed at an authentication server 100, a validation server 200, user device 156, and/or a validation device 201. For example, instructions for performing the method are stored in the memory 102 and executed by the processor(s) 104 of the authentication server computer system 100. In some embodiments, part or all of the instructions for performing the method are stored in the memory 202 and executed by the processor(s) 204 of the validation device(s) 201. In FIGS. 14A-14C, dotted lines are used to indicate optional operations.

The device receives (1402) first authentication information (e.g., authentication request 124*a*) for a first transaction. The first authentication information includes at least a first image (e.g., a still image, a video, and/or multiple frames from a video) that corresponds to a first identification document 302. For example, the first image is a reference image 300, such reference image 300*b* described with regard to FIG. 4. In some embodiments, the authentication request 124 is received from requesting device 154 or user device 156.

In some embodiments, the device (1404) causes the first image to be displayed by a display (e.g., output device 214) of the validation system (e.g., validation server 200 and/or validation device 201). For example, the device transmits the first image to the validation device 201 and/or transmits instructions to display the first image.

The device receives (1406) from the validation system (e.g., validation server 200 and/or validation device 201), first validation information 128 (e.g., information indicating a type of fault and/or a location of the fault) that corresponds to a first validation fault (e.g., a punch mark 404 as described with regard to FIGS. 4-9). In some embodiments, the first validation information indicates a location in the first image (e.g., reference image 300*b*) that corresponds to the first validation fault (e.g., punch mark 404). In some embodiments, the validation information 128 includes the first image.

In some embodiments, validation faults include fraud indications, including, for example:
- an indication that authentication image 350 is a digital copy of reference image 300;
- an indication that image manipulation occurred in the received reference image 300 and/or authentication image 350;
- an indication that reference image 300 has been cloned (e.g. at least a (modified) portion of reference image 300 has been used to create a submitted authentication image 350) and/or an indication that authentication image 350 has been cloned (e.g., at least a (modified) portion of authentication image 350 has been used to create a submitted reference image 300);
- an indication that an image submitted as reference image 300 and/or authentication image 350 has been spliced (e.g., the image is generated from at least a portion of an image that is distinct from reference image 300 and authentication image 350);
- an indication that text has been inserted into (and/or is missing from) reference image 300 and/or authentication image 350;
- an indication that the reference document depicted in reference image 350 is a punched document (e.g., a passport or license that has been punched to indicate that the document is no longer valid);
- an indication that data-masking (blurring, masking, and/or pixelization) has been applied to an image (e.g., reference image 300 and/or authentication image 350);
- an indication that an irregularity is detected in a feature of reference image 300 that corresponds to a feature of the document type of reference document 302;
- an indication that one or more text features (e.g., font type, font size, inclination, and/or kerning) that corresponds to the reference document 302 is different from a font type detected in reference image 300; and/or
- an indication that a layout irregularity is detected in reference image 300 (e.g., variation from an average layout determined for a document type of reference document 302 and/or an incorrect location of data and/or graphical elements of reference document 302).

In some embodiments, validation faults include readability faults, including, for example:
- a document finding error (e.g., no document is found in reference image 300 and/or only a portion of a document is found in reference image 300);

an optical character recognition (OCR) fault (e.g., text in image not recognized by OCR and/or no text detected in reference image 300 of an identification document of a type that requires text);

blurriness (e.g., document does not meet sharpness and/or contrast criteria);

motion blur (e.g., smearing or other indication that document moved during image and/or video capture);

glare (e.g., a portion of an image and/or text in the image is obscured by glare), and/or unintentional data-masking (e.g., fingers or other objects are visible in the submitted image, a portion of the reference document 302 is covered, and/or an insufficient portion of the reference document 302 or face 352 is visible in the image).

The device stores (1408), by data storage of a machine learning system (e.g., memory 102 of authentication server 100 that includes machine learning module 126), the first validation information 128. In some embodiments, the stored first validation information is used by machine learning module 126 (e.g., using supervised training module 130) to train authentication model 136. In some embodiments, the machine learning module 126 uses validation information 128 that corresponds to a plurality (typically a very large number) of authentication requests 124 to generate authentication model 136. For example, data points from millions of transactions are used to train the authentication model 136.

The device receives (1410) second authentication information (e.g., authentication request 124*b*) for a second transaction. The second authentication information includes a second image (e.g., as shown at 300*c* in FIG. 10) that corresponds to a second identification document (e.g., distinct from the first identification document).

In some embodiments, the machine learning module 126, having trained authentication module 126 to recognize the punched document fault based on input received via validation user interface 222 (e.g., as described with regard to FIGS. 5-9), uses the trained authentication model 136 to determine whether the same fault is present in an image included in an incoming authentication request (e.g., as described with regard to FIGS. 10-11).

The device determines (1412), using the machine learning system, a first validation value that corresponds to a probability that the second image includes the first validation fault. In some embodiments, the machine learning module 126 applies authentication model 136 trained using supervised training 130. For example, the machine learning module 126 applies authentication model 136, which has been trained using human tagged fault information (e.g., fault information indicating the punch mark 404 in reference image 300*b*) included in validation information 128, to determine a confidence value indicating a probability that the validation fault (e.g., punch mark 1004) is present in the second image (e.g., reference image 300*c*). In some embodiments, the machine learning module 126 applies authentication model 136 trained using unsupervised training 132. Typically, validation information (e.g., indicating presence and/or location of punch marks) indicating information regarding faults detected in image from a large number of authentication requests is used to train the authentication model 136 (e.g., prior to using authentication model 136 to identify a fault in reference images such as reference image 300*c*). In some embodiments, the device determines (e.g., simultaneously or substantially simultaneously), using the machine learning system, validation values for a set of validation faults that includes the first validation fault and at least one additional validation fault (e.g., the second validation fault as described with regard to 1430).

The device determines (1414), using the first validation value, whether fault review criteria are met. For example, the fault review criteria include a criterion that is met in accordance with a determination that the first validation value exceeds a threshold uncertainty value. In accordance with a determination that the fault review criteria are met (e.g., indicating that human review is required), the method proceeds to operation 1420. In some embodiments, in accordance with a determination that the fault review criteria are not met, the method proceeds to operation 1416. In some embodiments, the device determines whether fault review criteria are met for each respective validation fault of a set of validation faults that includes the first validation fault and at least one additional validation fault.

In some embodiments, in accordance with a determination that the fault review criteria are not met, the second image is displayed (1416) without information indicating that a fault is detected. For example, authentication device 100 transmits information to validation device 201 (e.g., information indicating that fault review criteria are not met and/or that no fault is detected) that causes validation device 201 to display a validation user interface 222 as described with regard to FIG. 5. In some embodiments, validation user interface 222 (e.g., as described with regard to FIG. 5) is displayed without image fault detection control 504 (e.g., because no fault is detected). In some embodiments, validation user interface 222 (e.g., as described with regard to FIG. 5) is displayed with image fault detection control 504 (e.g., to allow the human reviewer to override the determination by the machine learning module 126).

In some embodiments, in accordance with a determination that the fault review criteria are not met, the device (1418) transmits authentication information to a remote device. For example, authentication server 100 transmits authentication information to requesting device 154 and/or user device 156. In some embodiments, the authentication information includes information indicating that no faults are detected in the image. In some embodiments, the authentication information includes information indicating a validation value corresponding to a confidence level that no faults are detected in the image. In some embodiments, the authentication information includes information indicating that an authentication request is approved (e.g., in accordance with a determination that no fault is detected).

In some embodiments, in accordance with a determination that the fault review criteria are met, the device transmits (1420), to the validation system (e.g., for display by the first display or at a second display that is distinct from the first display), the second image. In some embodiments, authentication device 100 transmits information indicating that fault review criteria are met, that one or more faults are detected, and/or determined fault types of one or more detected faults. In some embodiments, the information transmitted by authentication device 100 to the validation system causes validation device 201 to display a validation user interface 222 as described with regard to FIGS. 10-11. For example, after the device transmits the second image, validation user interface 222 displays a second image 300*c* that is distinct from image 300*b* that was used to train the authentication model 136. In some embodiments, in accordance with a determination that the fault review criteria are met for one or more respective validation faults of a set of validation faults that includes the first validation fault and at least one additional validation fault, information corresponding to the one or more respective validation faults is transmitted to the validation system. In some embodiments, in accordance with a determination that the fault review criteria are met, the device transmits (1422) information indicating that a fault is detected in the second image. In some embodiments, the information indicating that the fault is detected in the second image is used by validation device 201 to display an indication that a fault is detected, highlighting a location of the fault, indicating a type of the fault, and or requesting confirmation of the presence, location, and/or type of the fault. For example, in FIGS. 10-11, indication 1004 (which indicates that an image fault has been detected) is displayed. In some embodiments, the device receives (1424) information from the validation system (e.g., information provided by a human reviewer via validation user interface 222) confirming the detected fault.

In some embodiments, in accordance with a determination that the fault review criteria are met, the device determines whether prompting criteria are met (e.g., based on the validation fault type and/or based on the validation value). In some embodiments, in accordance with a determination that prompting criteria are met, the device transmits (1426) information that causes a fault identification prompt (e.g., prompt 1006) to be displayed by the validation device 201.

In some embodiments, the device receives (1428) information from the validation system that corresponds to the first validation fault. For example, information corresponding to a location of the first validation fault (e.g., as indicated by selection box 1004, FIG. 11) and/or confirmation of a suggested validation type is transmitted by validation device 201 to authentication server 100 (e.g., via validation server 200). In some embodiments, the authentication server stores (e.g., by machine learning module 126), the information (e.g., received from validation device 201) that corresponds to the first validation fault.

In some embodiments, the device determines (1430) (e.g., using the machine learning module 126) a second validation value that corresponds to a probability that the second image of the second identification document includes a second validation fault, wherein the second validation value is used for determining whether the fault review criteria are met. For example, machine learning module 126 trains authentication model 136 to recognize a validation fault as described with regard to operation 1406 (e.g., a validation fault other than the punched document fault, such as a layout irregularity fault) based on input received via validation user interface 222 (e.g., as described with regard to FIG. 9). The machine learning module 126 uses the trained authentication model 136 to determine whether the second fault (e.g., the layout irregularity fault) is present in an image included in the received second authentication request.

In some embodiments, the device transmits (1432) information regarding the second authentication request (e.g., detection of the fault by the authentication model 136, confirmation of the fault, identification of the fault, location of the fault (as identified by authentication model 136 and/or by a human reviewer via validation user interface 222) and/or indication of unsuccessful authentication) to a remote device (e.g., the remote device from which the second authentication request was received, such as requesting device 154 or user device 156).

In some embodiments, the method proceeds from operation 1432 to operation 1402, as indicated at C.

In some embodiments, a quality review comparison is performed in which one or more results of the determinations made using machine learning module 126 (e.g., results including validation information as described with regard to operation 1406 and/or a first validation value as described with regard to operation 1412) are compared with results of corresponding determinations made by human reviewers. For example, for a set of authentication requests evaluated using authentication model 136, a matching set of authentication requests are provided to human reviewers (e.g., via a validation user interface 222 as described with regard to FIGS. 5-9). In some embodiments, discrepancies between the determinations made using machine learning module 126 and the determinations made by the human reviewers are used to train the authentication model 136. In some embodiments, discrepancies between the determinations made using machine learning module 126 and the determinations made by the human reviewers are reviewed by a quality control reviewer. In some embodiments, the quality control review results are used to train the authentication model 136. For example, in accordance with a quality control review determination that a result of a review performed by machine learning module 126 differs from a result performed by a human reviewer, if the quality control reviewer determines that the human review result was the correct result, a weight applied to one or more parameters of authentication model 136 are adjusted.

It should be understood that the particular order in which the operations in FIGS. 14A-14C have been described is merely an example and is not intended to indicate that the described order is the only order in which the operations could be performed. One of ordinary skill in the art would recognize various ways to reorder the operations described herein.

It will be understood that the flow described with regard to FIGS. 14A-14C is an example of flow using an exemplary first transaction and exemplary second transaction. In some embodiments, authentication server 100, validation server 200, and/or validation device(s) 201 process many transactions simultaneously.

Figure 15:
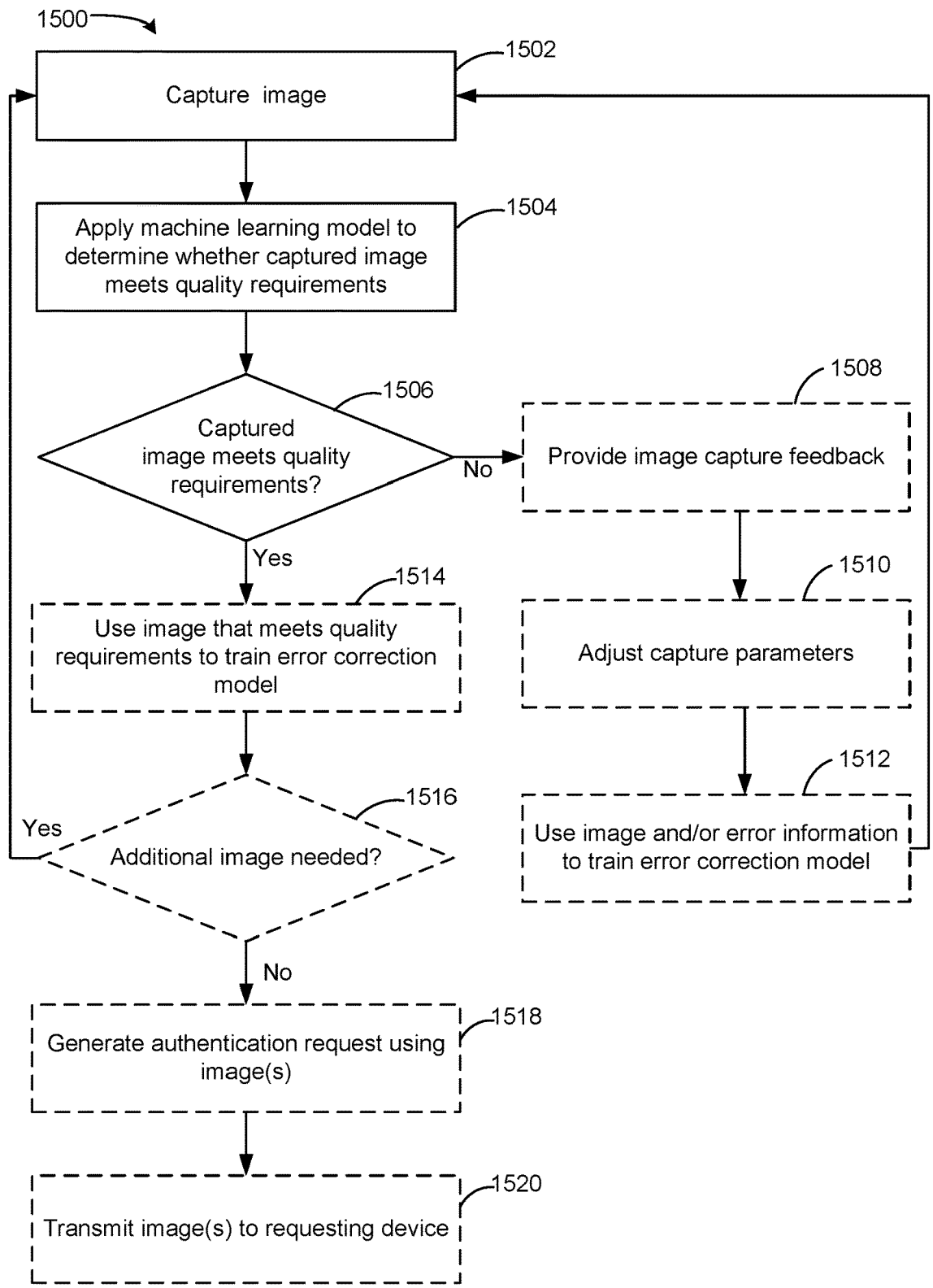
FIG. 15 is a flow diagram illustrating a method for using machine learning to provide feedback at a device that captures an image for an authentication request, in accordance with some embodiments.

FIG. 15 is a flow diagram illustrating a method 1500 for using machine learning to provide feedback at a device that captures an image for an authentication request, in accordance with some embodiments. The method is performed at user device 156, authentication server 100, validation device(s) 201, and/or validation server 200. For example, instructions for performing the method are stored in the memory 1202 and executed by the processor(s) 1204 of the user device 156. In some embodiments, part or all of the instructions for performing the method are stored in the memory 102 and executed by the processor(s) 104 of the authentication server 100. In FIG. 15, dotted lines are used to indicate optional operations.

It should be understood that the particular order in which the operations in FIG. 15 have been described is merely an example and is not intended to indicate that the described order is the only order in which the operations could be performed. One of ordinary skill in the art would recognize various ways to reorder the operations described herein.

In some embodiments, the device captures (1502) an image and/or video using camera 1214. For example, the device captures a reference image 300*a* of an identification document 302, or the device captures an authentication image 350*a* (e.g., a "selfie" image of the user). In some embodiments, the device captures sound data in addition to image data. For example, the device captures a video recording of the user that includes an audio recording.

In some embodiments, the device applies (1504) error correction model 1230 to the captured image to determine whether the image includes an image capture error (e.g., fraud indications and/or readability faults as described with regard to operation 1406).

In some embodiments, the device determines (1506) (e.g., based on the application of the error correction model 1230 to the captured image) whether the captured image meets quality requirements. In accordance with a determination that the captured image does not meet quality requirements (e.g., a validation value determined using error correction model 1230 for the captured image is above a threshold uncertainty threshold), the method proceeds to operation 1508. In accordance with a determination that the captured image meets quality requirements, the method proceeds to operation 1516.

In some embodiments, in accordance with a determination that the captured image does not meet quality requirements, the device provides (1508) image capture feedback. In some embodiments, image capture feedback includes an indication of a detected image capture error, instructions for avoiding a detected image capture error, and/or instructions for improving image quality. In some embodiments, image capture feedback is output by output device 1216 (e.g., a display and/or a speaker). For example, image capture feedback is displayed in a camera user interface 1232 (e.g., as illustrated by feedback message 1304) and/or provided via a text-to-speech module as audio output.

In some embodiments, in accordance with a determination that the captured image does not meet quality requirements, the device adjusts (1510) one or image capture parameters of camera 1214. In some embodiments, camera operation module 1224 adjusts one or more parameters (e.g., exposure, white balance, focal length, aperture, sensitivity (ISO), flash setting, and/or capture mode) of camera 1214. In some embodiments, camera operation module 1224 adjusts one or more parameters that correspond to at least one of one or more errors detected using error correction model 1230.

In an illustrative example, the error correction module 1230 determines, based on training data, that a captured image includes excessive glare (e.g., because a portion of a facial image is not visible where facial features would typically be present within a facial image and/or within a reference document; because a portion of text is missing where text would typically be present within a reference document; and/or because a level of contrast in a first portion of the document is lower than a level of contrast in a second portion of the document). In accordance with a determination that the captured image includes excessive glare, camera operation module 1224 adjusts a property of a flash system (e.g., by disabling a flash device, reducing flash intensity, activating an alternative flash mode, and/or activating a different flash producing device).

In some embodiments, in accordance with a determination that the captured image does not meet quality requirements, the device uses (1512) training information (e.g., the captured image and/or information regarding a detected image capture error) to train error correction model 1230. For example, user device 156 stores the training information or transmits the training information to authentication sever 100.

In some embodiments, in accordance with a determination that the captured image meets quality requirements, the device uses (1514) quality information (e.g., the captured image and, in some embodiments, a quality indication that the captured image meets the quality requirements) to train error correction model 1230. For example, user device 156 stores the quality information and/or transmits the quality information to authentication sever 100.

In some embodiments, the device determines (1516) whether additional image(s) are needed. For example, if a previously captured image was a reference image 300 and (no authentication image 350 has been captured), the device displays a prompt (e.g., in camera user interface 1232) to capture the authentication image 350, and if a previously captured image was an authentication image 350 and (no reference image 300 has been captured or previously provided), the device displays a prompt (e.g., in camera user interface 1232) to capture the reference image 300. In accordance with a determination that additional image(s) are needed, the method proceeds to operation 1502. In accordance with a determination that no additional image(s) are needed, the method proceeds to operation 1518.

In some embodiments, the device generates (1518) an authentication request 124 using the captured reference image 300 and or authentication image 350 (e.g., the images that met the quality requirements).

In some embodiments, the device transmits (1520) the captured reference image 300 and or authentication image 350 (e.g., the images that met the quality requirements) to the requesting device 154 (e.g., a device that generates an authentication request 124). In some embodiments, the device transmits device information (e.g., a serial number, model, and/or manufacturer of the device) and/or camera information (e.g., camera type, camera position relative to the device, and/or one or more image capture parameters) to the authentication server 100. In some embodiments, the device transmits captured audio and/or video to the authentication server 100. For example, the captured audio and/or video are used by device 156 and/or by authentication server 100 to evaluate whether live capture criteria are met.

Figure 16:
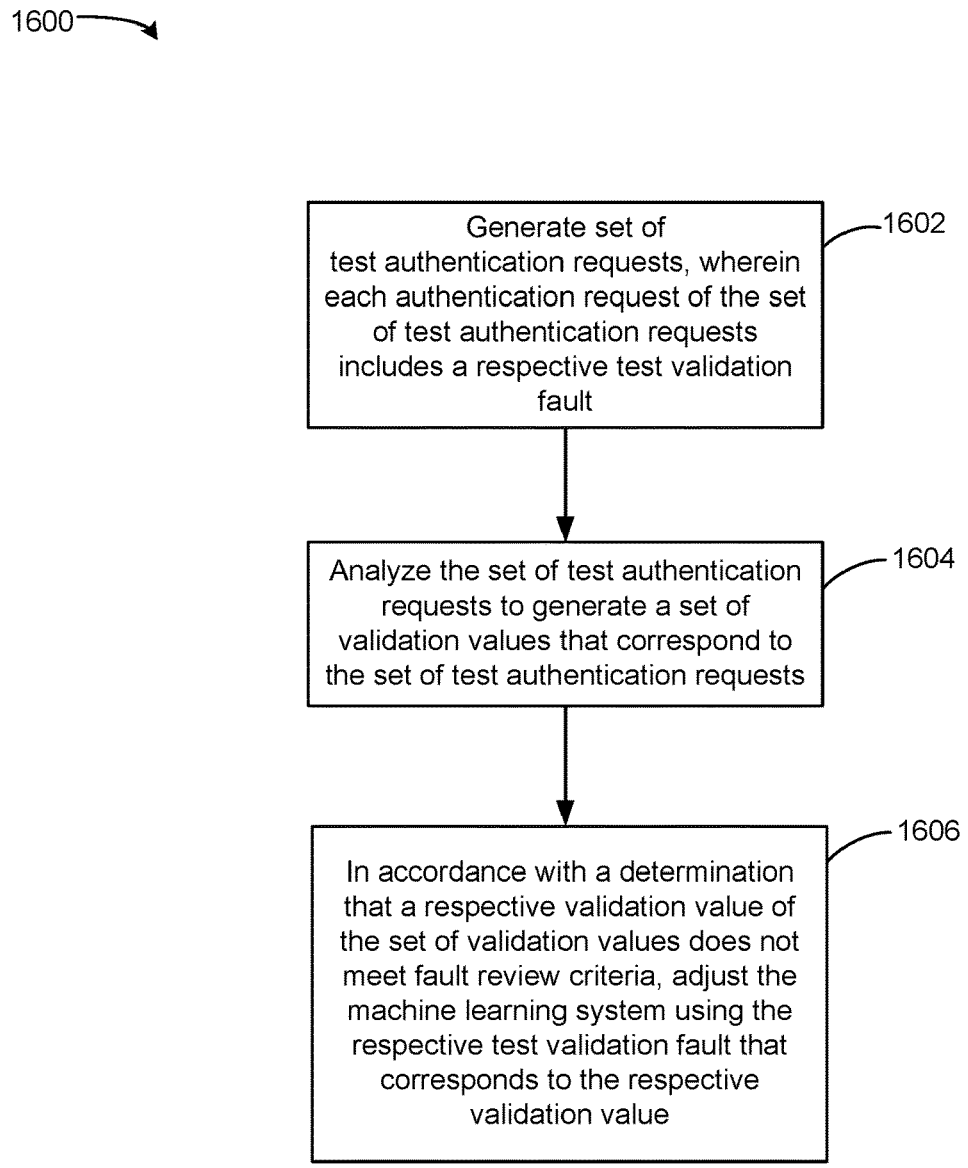
FIG. 16 is a flow diagram illustrating a method for generating adversarial tests to teach a machine learning system, in accordance with some embodiments.

FIG. 16 is a flow diagram illustrating a method 1600 for generating adversarial tests to teach a machine learning system, in accordance with some embodiments. The method is performed at an authentication server 100. For example, instructions for performing the method are stored in the memory 102 and executed by the processor(s) 104 of the authentication server computer system 100. In some embodiments, the method 1700 is performed by the machine learning module 126 (e.g., an adversarial training module 134 of the machine learning module 126).

In some embodiments, the device generates (1602) a set of test authentication requests. Each test authentication request of the set of test authentication requests includes a respective test validation fault (e.g., a fault as described with regard to operation 1406).

In some embodiments, the device analyzes (1604) the set of test authentication requests (e.g., by applying authentication model 136 to one or more images included in the authentication requests) to generate a set of validation values that corresponds to the set of test authentication requests. For example, machine learning module 126 determines validation values for the authentication requests (e.g., as described with regard to operation 1412).

In some embodiments, the device determines (1606) whether a respective validation value of the set of validation values does not meet fault review criteria (e.g., criteria that are met in accordance with a determination that the validation value is not within a predefined range of a target uncertainty value that corresponds to a test authentication request). In accordance with the determination that the respective validation value of the set of validation values does not meet the fault review criteria, the device adjusts the machine learning system (e.g., by adjusting authentication model 136). For example, authentication model 136 includes weights applied to each fault in a set of faults (e.g., as described with regard to operation 1406), and, in accordance with a determination that the respective validation value of the set of validation values does not meet the fault review criteria, the device adjusts a weight applied to the tested validation fault and/or adds a new validation fault.

In an illustrative example, the set of test authentication requests includes authentication requests in which a text feature (e.g., font size) in a reference image 300 is altered by varying degrees from the same text feature as found in a legitimate identification document. If an invalid text field passes through the machine learning system without triggering review, the machine learning system is adjusted to identify the invalid text.

It should be understood that the particular order in which the operations in FIG. 16 have been described is merely an example and is not intended to indicate that the described order is the only order in which the operations could be performed. One of ordinary skill in the art would recognize various ways to reorder the operations described herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102 and the memory 202) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 and the memory 202 include one or more storage devices remotely located from the CPU(s) 104 and 204. The memory 102 and the memory 202, or alternatively the non-volatile memory device(s) within these memories, comprises a non-transitory computer readable storage medium.

Communication systems as referred to herein (e.g., the communication system 108 and the communication system 208) optionally communicate via wired and/or wireless communication connections. Communication systems optionally communicate with networks (e.g., the networks 150 and 152), such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computer-implemented method, comprising:
   at a server system including one or more processors and memory storing one or more programs for execution by the one or more processors:
   receiving, over a network from a user device remote from the server system, a first authentication request to authenticate an identity of a user, wherein the first authentication request includes at least a first image that corresponds to a first identification document;
   receiving, from a validation system, first validation information indicating that a first validation fault of a plurality of fault types was detected in the first image;
   training a machine learning system using the first validation information to detect the first validation fault of the plurality of fault types;
   receiving a second authentication request to authenticate an identity of a user, wherein the second authentication request includes a second image that corresponds to a second identification document;

determining, using the machine learning system, a confidence value that indicates a probability that the second image includes the first validation fault of the plurality of fault types;

determining whether the confidence value exceeds a threshold uncertainty value; and in accordance with a determination that the confidence value exceeds the threshold uncertainty value, transmitting, to the validation system, the second image.

2. The computer-implemented method of claim 1, wherein the first validation information indicates a location in the first image that corresponds to the first validation fault of the plurality of fault types.

3. The computer-implemented method of claim 1, wherein:

in accordance with a determination that the confidence value does not exceed the threshold uncertainty value, transmitting the second authentication request to a remote device.

4. The computer-implemented method of claim 1, wherein:

in accordance with a determination that the confidence value exceeds the threshold uncertainty value:
determining whether prompting criteria are met; and,
in accordance with a determination that the prompting criteria are met, transmitting information for displaying a prompt for information that corresponds to the first validation fault of the plurality of fault types in the first identification document.

5. The computer-implemented method of claim 1, including:

receiving the first validation information indicating that the first validation fault of the plurality of fault types was detected in the first image; and storing, by data storage of the machine learning system, the first validation information indicating that the first validation fault of the plurality of fault types was detected in the first image.

6. The computer-implemented method of claim 1, including:

determining, using the machine learning system, a second validation value that corresponds to a probability that the second image of the second identification document includes a second validation fault of the plurality of fault types, distinct from the first validation fault of the plurality of fault types.

7. The computer-implemented method of claim 6, including:

analyzing, using the machine learning system, a set of incoming authentication requests;

determining, by the machine learning system, a subset of the set of incoming authentication requests that correspond to invalid authentication request activity; and wherein the second validation fault of the plurality of fault types is an invalidity characteristic of the subset of the set of incoming authentication requests.

8. The computer-implemented method of claim 1, including:

generating, using the machine learning system, a set of test authentication requests, wherein each test authentication request of the set of test authentication requests includes a respective test validation fault of the plurality of fault types;

analyzing, by the machine learning system, the set of test authentication requests to generate a set of validation values that corresponds to the set of test authentication requests;

determining that a respective validation value of the set of validation values does not meet fault review criteria; and in accordance with the determination that the respective validation value of the set of validation values does not meet the fault review criteria, adjusting the machine learning system using the respective test validation fault of the plurality of fault types that corresponds to the respective validation value.

9. A non-transitory computer readable storage medium storing one or more programs, the one or more programs comprising instructions, which when executed, cause a server system to:

receive, over a network from a user device remote from the server system, a first authentication request to authenticate an identity of a user, wherein the first authentication request includes at least a first image that corresponds to a first identification document;

receive, from a validation system, first validation information indicating that a first validation fault of a plurality of fault types was detected in the first image;

training a machine learning system, using the first validation information, to detect the first validation fault of the plurality of fault types;

receive a second authentication request to authenticate an identity of a user, wherein the second authentication request includes a second image that corresponds to a second identification document;

determine, using the machine learning system, a confidence value that indicates a probability that the second image includes the first validation fault of the plurality of fault types;

determine whether the confidence value exceeds a threshold uncertainty value; and in accordance with a determination that the confidence value exceeds the threshold uncertainty value, transmitting, to the validation system, the second image.

10. The non-transitory computer readable storage medium of claim 9, wherein the first validation information indicates a location in the first image that corresponds to the first validation fault of the plurality of fault types.

11. The non-transitory computer readable storage medium of claim 9, wherein the one or more programs include instructions that cause the server system to, in accordance with a determination that confidence value does not exceed the threshold uncertainty value, transmit the second authentication request to a remote device.

12. The non-transitory computer readable storage medium of claim 9, wherein the one or more programs include instructions that cause the server system to, in accordance with a determination that the confidence value exceeds the threshold uncertainty value:

determine whether prompting criteria are met; and, in accordance with a determination that the prompting criteria are met, transmitting information for displaying a prompt for information that corresponds to the first validation fault of the plurality of fault types in the first identification document.

13. The non-transitory computer readable storage medium of claim 12, wherein the one or more programs include instructions that cause the server system to:

receive the first validation information indicating that the first validation fault of the plurality of fault types was detected in the first image; and store, by data storage of the machine learning system, the first validation information indicating that the first validation fault of the plurality of fault types was detected in the first image.

14. The non-transitory computer readable storage medium of claim 9, wherein the one or more programs include instructions that cause the server system to:
   determine, using the machine learning system, a second validation value that corresponds to a probability that the second image of the second identification document includes a second validation fault of the plurality of fault types, distinct from the first validation fault of the plurality of fault types.

15. The non-transitory computer readable storage medium of claim 14, wherein the one or more programs include instructions that cause the server system to:
   analyze, using the machine learning system, a set of incoming authentication requests;
   determine, by the machine learning system, a subset of the set of incoming authentication requests that correspond to invalid authentication request activity; and
   wherein the second validation fault of the plurality of fault types is an invalidity characteristic of the subset of the set of incoming authentication requests.

16. The non-transitory computer readable storage medium of claim 9, wherein the one or more programs include instructions that cause the server system to:
   generate, using the machine learning system, a set of test authentication requests, wherein each test authentication request of the set of test authentication requests includes a respective test validation fault of the plurality of fault types;
   analyze, by the machine learning system, the set of test authentication requests to generate a set of validation values that corresponds to the set of test authentication requests;
   determine that a respective validation value of the set of validation values does not meet fault review criteria; and
   in accordance with the determination that the respective validation value of the set of validation values does not meet the fault review criteria, adjusting the machine learning system using the respective test validation fault of the plurality of fault types that corresponds to the respective validation value.

17. A server system, comprising:
   one or more processors;
   memory; and
   one or more programs, wherein the one or more programs are stored in the memory and are configured for execution by the one or more processors, the one or more programs including instructions for:
      receiving, over a network from a user device remote from the server system, a first authentication request to authenticate an identity of a user, wherein the first authentication request includes at least a first image that corresponds to a first identification document;
      receiving, from a validation system, first validation information that indicating a first validation fault of a plurality of fault types was detected in the first image;
      training a machine learning system using the first validation information to detect the first validation fault of the plurality of fault types;
      receiving a second authentication request to authenticate an identity of a user, wherein the second authentication request includes a second image that corresponds to a second identification document;
      determining, using the machine learning system, a confidence value that indicates a probability that the second image includes the first validation fault of the plurality of fault types;
      determining whether the confidence value exceeds a threshold uncertainty value; and
      in accordance with a determination that the confidence value exceeds the threshold uncertainty value, transmitting, to the validation system, the second image.

18. The server system of claim 17, wherein the first validation information indicates a location in the first image that corresponds to the first validation fault of the plurality of fault types.

19. The server system of claim 17, wherein the one or more programs include instructions for, in accordance with a determination that the confidence value does not exceed the threshold uncertainty value, transmitting the second authentication request to a remote device.

20. The server system of claim 17, wherein the one or more programs including instructions for, in accordance with a determination that the confidence value exceeds the threshold uncertainty value:
   determining whether prompting criteria are met; and,
   in accordance with a determination that the prompting criteria are met, transmitting information for displaying a prompt for information that corresponds to the first validation fault of the plurality of fault types in the first identification document.

21. The server system of claim 20, wherein the one or more programs including instructions for:
   receiving the first validation information indicating that the first validation fault of the plurality of fault types was detected in the first image; and
   storing, by data storage of the machine learning system, the first validation information indicating that the first validation fault of the plurality of fault types was detected in the first image.

22. The server system of claim 17, wherein the one or more programs including instructions for:
   determining, using the machine learning system, a second validation value that corresponds to a probability that the second image of the second identification document includes a second validation fault of the plurality of fault types, distinct from the first validation fault of the plurality of fault types.

23. The server system of claim 22, wherein the one or more programs including instructions for:
   analyzing, using the machine learning system, a set of incoming authentication requests;
   determining, by the machine learning system, a subset of the set of incoming authentication requests that correspond to invalid authentication request activity; and
   wherein the second validation fault of the plurality of fault types is an invalidity characteristic of the subset of the set of incoming authentication requests.

24. The server system of claim 17, wherein the one or more programs including instructions for:
   generating, using the machine learning system, a set of test authentication requests, wherein each test authentication request of the set of test authentication requests includes a respective test validation fault of the plurality of fault types;

analyzing, by the machine learning system, the set of test authentication requests to generate a set of validation values that corresponds to the set of test authentication requests;

determining that a respective validation value of the set of validation values does not meet fault review criteria; and in accordance with the determination that the respective validation value of the set of validation values does not meet the fault review criteria, adjusting the machine learning system using the respective test validation fault of the plurality of fault types that corresponds to the respective validation value.

\* \* \* \* \*